US011795760B2

(12) United States Patent
Caldwell et al.

(10) Patent No.: US 11,795,760 B2
(45) Date of Patent: Oct. 24, 2023

(54) LADDER TRIPOD ASSEMBLY AND SYSTEM

(71) Applicant: Core Distribution, Inc., Minneapolis, MN (US)

(72) Inventors: Allen A. Caldwell, Shakopee, MN (US); Mitchell I. Kieffer, Key Biscayne, FL (US)

(73) Assignee: Core Distribution, Inc., Minneapolis, MN (US)

( * ) Notice: Subject to any disclaimer, the term of this patent is extended or adjusted under 35 U.S.C. 154(b) by 398 days.

(21) Appl. No.: 17/068,074

(22) Filed: Oct. 12, 2020

(65) Prior Publication Data

US 2021/0123302 A1  Apr. 29, 2021

Related U.S. Application Data

(60) Provisional application No. 62/925,400, filed on Oct. 24, 2019.

(51) Int. Cl.
*E06C 1/38* (2006.01)
*E06C 7/50* (2006.01)
(Continued)

(52) U.S. Cl.
CPC ............... *E06C 1/382* (2013.01); *E06C 1/22* (2013.01); *E06C 7/423* (2013.01); *E06C 7/50* (2013.01)

(58) Field of Classification Search
CPC .......... E06C 1/382; E06C 7/423; F16M 11/28
See application file for complete search history.

(56) References Cited

U.S. PATENT DOCUMENTS 329,494 A * 11/1885 Schweinfurt ............. E05C 1/10
292/175
372,165 A    11/1907 Adler
(Continued)

FOREIGN PATENT DOCUMENTS

AU    4379779 A1    8/1980
CA    2157842 A1    3/1997
(Continued)

OTHER PUBLICATIONS

International Patent Application No. PCT/US2020/057103, International Search Report and Written Opinion dated Feb. 10, 2021, 15 pages.
(Continued)

*Primary Examiner* — Jessica L Laux
*Assistant Examiner* — Kathleen M. McFarland
(74) *Attorney, Agent, or Firm* — Fredrikson & Byron, P.A.

(57) ABSTRACT

A tripod assembly includes a plurality of columns disposed in a nested arrangement for relative axial movement in a telescopic fashion along a longitudinal axis of the plurality of columns between a fully-extended position and a collapsed position. When the columns are collapsed from the fully-extended position each column substantially nests within another one of the columns. The plurality of columns are received within the central post when the plurality of columns is in the collapsed position. The bracket assembly is coupled to the second end of the connecting rod, and the bracket assembly is configured to receive a selectable rung of a ladder therein. The bracket member is coupled to an uppermost one of the columns, and the bracket member includes a channel configured to receive a second selectable rung of the ladder.

16 Claims, 27 Drawing Sheets

(51) Int. Cl.
*E06C 7/42* (2006.01)
*E06C 1/22* (2006.01)

(56) References Cited

U.S. PATENT DOCUMENTS

| | | | | |
|---|---|---|---|---|
| 872,165 A * | 11/1907 | Alder | ........................ | E06C 7/10 182/228.3 |
| 1,045,957 A * | 12/1912 | Dicks | ........................ | F16L 9/18 D25/64 |
| 1,114,921 A * | 10/1914 | Selstad | ..................... | E06C 7/14 248/210 |
| 1,712,942 A * | 5/1929 | Smith | ..................... | E06C 1/125 182/195 |
| 2,127,035 A * | 8/1938 | Kirlin | ...................... | E06C 7/48 182/228.1 |
| 2,194,856 A * | 3/1940 | Kostuk | ..................... | E06C 7/44 182/195 |
| 2,486,783 A * | 11/1949 | Hartman | ................ | E06C 7/165 182/120 |
| 2,827,216 A * | 3/1958 | Napolitano | ............. | E06C 1/125 182/180.1 |
| 2,993,561 A * | 7/1961 | Watson | ................... | E06C 1/125 182/195 |
| 3,033,309 A * | 5/1962 | Fugere | ...................... | B60R 3/02 182/189 |
| 3,085,651 A * | 4/1963 | Rich | ........................ | E06C 7/08 D25/64 |
| 3,085,652 A * | 4/1963 | Rich | ........................ | E06C 7/08 182/216 |
| 3,451,506 A * | 6/1969 | Neal | ........................ | E06C 1/125 182/195 |
| 3,474,883 A * | 10/1969 | Weis | ........................ | E06C 7/423 182/129 |
| 3,643,292 A * | 2/1972 | Mayer | ........................ | E06C 1/32 16/325 |
| 3,653,463 A * | 4/1972 | Neal | ........................ | E06C 1/125 182/195 |
| 3,747,975 A * | 7/1973 | McGregor | ............... | A47C 7/70 292/202 |
| 3,795,422 A * | 3/1974 | Robinson | ............... | B60N 3/004 297/146 |
| 3,858,684 A * | 1/1975 | Goings | ................... | E06C 1/125 182/228.6 |
| 3,978,944 A * | 9/1976 | Hickman | ................ | E06C 1/381 182/162 |
| 3,991,852 A * | 11/1976 | Brookes | .................... | E06C 1/20 182/127 |
| 4,002,223 A * | 1/1977 | Bernkrant | ............... | B63B 27/14 182/228.1 |
| 4,086,980 A * | 5/1978 | Shortes | ..................... | E06C 1/10 182/178.3 |
| 4,100,448 A * | 7/1978 | Chipner | ................... | H01K 1/44 362/306 |
| D248,839 S | 8/1978 | Turner | | |
| 4,119,177 A * | 10/1978 | Andersson | ............... | E06C 1/125 182/195 |
| 4,152,810 A * | 5/1979 | Martinez | ................... | E06C 1/32 403/92 |
| 4,182,431 A * | 1/1980 | Wing | ........................ | E06C 1/32 182/228.1 |
| D254,630 S | 4/1980 | Aberer et al. | | |
| 4,376,470 A * | 3/1983 | Ashton | ..................... | E06C 7/08 182/228.2 |
| 4,429,766 A * | 2/1984 | Alimbau Marques | .... | E06C 1/12 182/195 |
| 4,448,283 A * | 5/1984 | Marques | ..................... | E06C 1/12 182/164 |
| 4,457,391 A * | 7/1984 | Alimbau Marques | .... | E06C 1/52 182/164 |
| 4,483,415 A * | 11/1984 | Disston | ..................... | E06C 1/22 182/156 |
| 4,524,849 A * | 6/1985 | Riddle | ........................ | F16M 11/242 182/189 |
| 4,549,632 A * | 10/1985 | Inoue | ..................... | E06C 1/383 182/162 |
| 4,566,150 A * | 1/1986 | Boothe | ..................... | E06C 1/32 16/349 |
| 4,574,918 A * | 3/1986 | Marques | ................... | E06C 1/52 182/164 |
| 4,627,149 A * | 12/1986 | Colas | ..................... | B21D 39/06 29/520 |
| 4,770,559 A * | 9/1988 | Yoo | ........................ | F16C 11/10 403/324 |
| 4,798,262 A * | 1/1989 | Margolies | ................. | E06C 1/20 182/172 |
| 4,899,849 A * | 2/1990 | Levi | ..................... | F16B 7/1427 182/172 |
| 4,926,967 A * | 5/1990 | Baker Mervyn R. | .... | E06C 1/56 182/220 |
| 4,967,484 A * | 11/1990 | Nosek | ..................... | G01B 3/12 403/109.8 |
| 4,989,692 A * | 2/1991 | Min | ........................ | E06C 1/39 182/24 |
| 5,058,239 A * | 10/1991 | Lee | ........................ | F16C 11/10 403/93 |
| 5,074,377 A * | 12/1991 | Krause | ..................... | E06C 7/42 182/209 |
| 5,142,739 A * | 9/1992 | Lin | ..................... | E05D 11/1007 16/326 |
| 5,417,511 A * | 5/1995 | Warden | ................. | F16B 7/1427 403/109.5 |
| 5,492,430 A * | 2/1996 | Jones | ........................ | F16B 7/149 403/109.5 |
| 5,495,915 A * | 3/1996 | Weston | ................... | E06C 1/125 182/195 |
| 5,577,574 A * | 11/1996 | Joseph | ..................... | E06C 7/08 182/174 |
| 5,577,722 A * | 11/1996 | Glassberg | ............... | A63B 59/50 473/568 |
| 5,590,739 A * | 1/1997 | High | ........................ | E06C 1/397 182/208 |
| 5,593,239 A * | 1/1997 | Sallee | ..................... | E04H 12/182 403/377 |
| 5,603,435 A * | 2/1997 | Fenwick | ............... | B05C 17/00569 198/662 |
| 5,620,272 A * | 4/1997 | Sheng | ........................ | E06C 1/32 403/92 |
| 5,645,140 A * | 7/1997 | Mouneimneh | .......... | E06C 1/125 182/195 |
| 5,738,186 A * | 4/1998 | Jones | ..................... | E06C 1/125 182/195 |
| 5,743,355 A * | 4/1998 | McDonnell | ............. | E06C 1/125 182/195 |
| 5,775,460 A * | 7/1998 | Stone | ........................ | F16C 11/04 182/24 |
| 5,803,290 A * | 9/1998 | Bongiorno | ........... | B65D 23/102 220/675 |
| 5,876,011 A * | 3/1999 | Blasing | ................. | F16M 11/046 403/109.1 |
| 5,924,658 A * | 7/1999 | Shiery | ..................... | F16B 7/1409 248/161 |
| 5,954,157 A * | 9/1999 | Grimes | ..................... | E06C 1/32 16/329 |
| 5,992,566 A * | 11/1999 | Yeh | ........................ | E06C 1/32 403/92 |
| 6,006,399 A * | 12/1999 | Massaro | ................... | A47L 9/244 285/298 |
| 6,006,952 A * | 12/1999 | Lucas | ..................... | B65D 47/243 222/481.5 |
| 6,053,284 A * | 4/2000 | Fountain | ................. | E06C 7/423 182/180.2 |
| 6,199,660 B1* | 3/2001 | Meeks | ..................... | A01M 31/02 182/187 |
| 6,343,406 B1* | 2/2002 | Yeh | ........................ | E06C 1/32 182/163 |
| 6,361,002 B1* | 3/2002 | Cheng | ..................... | F16B 7/1427 403/109.5 |
| 6,402,330 B1* | 6/2002 | Scheidegg | ............ | B60R 1/0605 359/872 |

(56) References Cited

U.S. PATENT DOCUMENTS

| | | | |
|---|---|---|---|
| D462,453 S | 9/2002 | Johansson | |
| 6,461,074 B2* | 10/2002 | Taylor | B25G 1/04 403/109.1 |
| 6,520,291 B2* | 2/2003 | Andrey | A01M 31/02 182/195 |
| 6,546,596 B2* | 4/2003 | Grote | B25G 1/04 16/113.1 |
| 6,672,427 B1* | 1/2004 | Sheffield | E06C 7/42 182/172 |
| 6,676,095 B2* | 1/2004 | Dal Pra' | B62J 1/08 248/316.4 |
| 6,708,800 B2 | 3/2004 | Kieffer et al. | |
| 6,857,503 B2 | 2/2005 | Simpson et al. | |
| 6,883,645 B2 | 4/2005 | Kieffer et al. | |
| 6,993,808 B1* | 2/2006 | Bennett | A61F 5/0125 16/334 |
| 6,999,253 B1* | 2/2006 | Niwa | G02B 26/008 356/418 |
| 7,007,344 B2* | 3/2006 | Lee | E06C 1/32 403/68 |
| 7,047,597 B2* | 5/2006 | Lee | E06C 1/32 16/233 |
| 7,048,094 B2 | 5/2006 | Kieffer et al. | |
| 7,080,714 B2* | 7/2006 | Stout | E06C 5/00 182/127 |
| 7,140,072 B2* | 11/2006 | Leng | E06C 1/32 16/326 |
| 7,306,075 B2* | 12/2007 | Winslow | E06C 1/18 182/163 |
| 7,364,017 B2* | 4/2008 | Moss | E06C 1/22 182/163 |
| 7,424,933 B2 | 9/2008 | Weiss | |
| 7,445,086 B1* | 11/2008 | Sizemore | E06C 7/081 182/108 |
| 8,056,679 B2* | 11/2011 | Hong | E06C 1/12 182/195 |
| 8,104,580 B2 | 1/2012 | Eriksson | |
| 8,225,906 B2* | 7/2012 | Kieffer | E06C 1/125 182/228.3 |
| 8,348,015 B2 | 1/2013 | Parker | |
| 8,381,873 B2 | 2/2013 | Cross et al. | |
| 8,387,753 B2 | 3/2013 | Kieffer et al. | |
| 8,591,444 B2* | 11/2013 | Bejarano | A61F 5/0125 602/23 |
| 8,869,939 B2* | 10/2014 | Kuo | E06C 7/44 182/195 |
| 8,979,053 B2* | 3/2015 | Deal | E06C 7/48 248/237 |
| 9,033,104 B1* | 5/2015 | Calloway | E06C 7/42 182/107 |
| 9,126,622 B2* | 9/2015 | Hebenstreit | B62D 1/20 |
| 9,322,192 B2* | 4/2016 | Burd | B64D 11/0007 |
| 9,416,591 B2* | 8/2016 | Kieffer | E06C 1/32 |
| 9,580,959 B2* | 2/2017 | Kieffer | E06C 1/125 |
| 9,771,756 B1* | 9/2017 | Gregoire | E06C 7/42 |
| 9,803,799 B1* | 10/2017 | Yang | F16M 11/2064 |
| 10,005,652 B1* | 6/2018 | Cui | E04G 1/24 |
| 10,233,692 B2* | 3/2019 | Kieffer | E06C 1/125 |
| 10,619,416 B1* | 4/2020 | Snell | E06C 7/06 |
| 10,663,839 B1* | 5/2020 | O'Brien | F16M 11/16 |
| 10,767,418 B2* | 9/2020 | Moreno Moncada | E06C 1/20 |
| 10,865,602 B1* | 12/2020 | Varshavsky | E06C 7/04 |
| 10,901,301 B2* | 1/2021 | Jankura | G03B 17/561 |
| 11,186,372 B2* | 11/2021 | Drenzeck | B64D 11/0638 |
| 11,525,542 B2* | 12/2022 | Liao | F16M 11/10 |
| 2002/0088091 A1* | 7/2002 | Grote | B25G 1/04 16/429 |
| 2003/0012595 A1* | 1/2003 | Park | E06C 1/32 403/84 |
| 2003/0029676 A1* | 2/2003 | Gibson | E06C 1/393 182/161 |
| 2003/0062219 A1* | 4/2003 | Yeh | E06C 1/32 403/92 |
| 2003/0079356 A1* | 5/2003 | Crain | G01C 15/06 33/296 |
| 2003/0127288 A1* | 7/2003 | Ed | E06C 1/38 182/206 |
| 2003/0188923 A1* | 10/2003 | Moss | E06C 7/085 182/163 |
| 2003/0217888 A1* | 11/2003 | Simpson | E06C 1/20 182/163 |
| 2004/0020718 A1* | 2/2004 | Kieffer | E06C 7/06 182/195 |
| 2004/0129497 A1* | 7/2004 | Weiss | E06C 1/32 182/163 |
| 2004/0195043 A1* | 10/2004 | Johansson | E06C 1/125 182/195 |
| 2005/0121261 A1* | 6/2005 | Moss | E06C 7/423 182/165 |
| 2005/0189174 A1* | 9/2005 | Stout | E06C 7/50 182/127 |
| 2005/0218275 A1* | 10/2005 | Keating | F16L 3/04 248/176.1 |
| 2005/0268434 A1* | 12/2005 | Burbrink | E06C 1/32 16/324 |
| 2005/0274571 A1* | 12/2005 | Simpson | E06C 7/083 182/23 |
| 2006/0071040 A1* | 4/2006 | Young | B65D 47/0838 222/484 |
| 2006/0086869 A1* | 4/2006 | Hsieh | F16M 11/16 248/171 |
| 2006/0155230 A1* | 7/2006 | Mason | A61F 5/0125 602/26 |
| 2006/0283664 A1* | 12/2006 | Yao | E06C 7/06 182/156 |
| 2007/0067957 A1* | 3/2007 | Moore | A61F 5/0125 16/326 |
| 2007/0201943 A1* | 8/2007 | Yeh | E06C 1/32 403/100 |
| 2007/0209875 A1* | 9/2007 | Chen | E06C 1/125 182/195 |
| 2007/0267252 A1* | 11/2007 | Yao | E06C 1/125 182/195 |
| 2008/0000723 A1* | 1/2008 | Kieffer | E06C 1/125 182/195 |
| 2008/0023269 A1* | 1/2008 | Parker | E04F 11/068 182/195 |
| 2008/0073150 A1* | 3/2008 | Lin | E06C 1/32 182/163 |
| 2008/0109994 A1* | 5/2008 | Liao | E06C 1/32 16/319 |
| 2009/0050407 A1* | 2/2009 | Eriksson | E06C 1/18 182/195 |
| 2009/0065304 A1* | 3/2009 | Jian | E06C 1/125 182/209 |
| 2009/0078503 A1* | 3/2009 | Eriksson | E06C 1/22 182/104 |
| 2010/0071996 A1* | 3/2010 | Huang | E04G 1/34 182/118 |
| 2010/0147623 A1* | 6/2010 | Pocos | E06C 7/423 102/200 |
| 2010/0258379 A1* | 10/2010 | Mickens | E06C 1/125 182/195 |
| 2011/0017549 A1* | 1/2011 | Lietz | E06C 7/423 182/172 |
| 2011/0056764 A1* | 3/2011 | Cross | E06C 1/32 182/27 |
| 2012/0267197 A1 | 10/2012 | Kieffer et al. | |
| 2013/0068560 A1* | 3/2013 | Estep | E06C 7/188 182/107 |
| 2013/0284870 A1* | 10/2013 | Deal | E06C 7/50 248/237 |
| 2015/0204138 A1* | 7/2015 | Weston | E06C 7/50 182/207 |
| 2015/0315844 A1* | 11/2015 | Miao | E06C 7/50 16/319 |
| 2016/0153234 A1* | 6/2016 | Mazanek | E06C 7/188 248/354.1 |
| 2018/0144727 A1* | 5/2018 | May | G10G 5/00 |

(56) References Cited

U.S. PATENT DOCUMENTS

| | | | | |
|---|---|---|---|---|
| 2018/0266178 | A1* | 9/2018 | Sapp | E06C 7/48 |
| 2019/0055783 | A1* | 2/2019 | Kieffer | E06C 7/003 |
| 2019/0093428 | A1 | 3/2019 | Kieffer et al. | |
| 2019/0136623 | A1* | 5/2019 | Kieffer | F16B 7/105 |
| 2022/0349516 | A1* | 11/2022 | Liao | F16M 11/10 |

FOREIGN PATENT DOCUMENTS

| | | |
|---|---|---|
| CN | 2070807 U | 2/1991 |
| CN | 2610056 Y | 4/2004 |
| CN | 200952346 Y | 9/2007 |
| CN | 200978618 Y | 11/2007 |
| CN | 201318118 Y | 9/2009 |
| CN | 107075905 A | 8/2017 |
| DE | 4408095 A1 | 9/1995 |
| DE | 19501689 A1 | 8/1996 |
| DE | 19530452 A1 | 2/1997 |
| DE | 20207715 U1 | 9/2003 |
| DE | 202013009466 U1 | 11/2013 |
| EP | 1402143 A1 | 3/2004 |
| EP | 1516999 A2 | 3/2005 |
| EP | 1728966 A1 | 12/2006 |
| EP | 1816312 A2 | 8/2007 |
| FR | 3012511 A | 5/2015 |
| JP | 2010024799 A | 2/2010 |
| TW | M248901 U | 11/2004 |
| WO | 9115651 A1 | 10/1991 |
| WO | 9302271 A1 | 2/1993 |
| WO | 9523907 A1 | 9/1995 |
| WO | 02101189 A1 | 12/2002 |
| WO | 2004044365 A2 | 5/2004 |
| WO | 2005045172 A1 | 5/2005 |
| WO | 2006082032 A1 | 8/2006 |
| WO | 2006128845 A1 | 12/2006 |
| WO | 2008064532 A1 | 6/2008 |
| WO | 2009057995 A1 | 5/2009 |

OTHER PUBLICATIONS

Brochure, The World's Broadest Line of Telescopic Ladders, pp. 2-3. www.telesteps.com. 2009.

\* cited by examiner

LADDER TRIPOD ASSEMBLY AND SYSTEM

CROSS-REFERENCES

This application claims the benefit of U.S. Provisional Application No. 62/925,400, filed Oct. 24, 2019, the content of which is hereby incorporated by reference in its entirety.

BACKGROUND OF THE INVENTION

A tripod is a portable stand used to support and stabilize an object and typically includes three legs and a mount. The legs can be pulled apart and placed onto a desired surface, and the object to be stabilized can then be attached to the mount. After use, the legs can be collapsed to facilitate storage and transport of the tripod.

SUMMARY OF THE INVENTION

Certain embodiments of the invention provide a tripod assembly comprising a plurality of legs, a central support member, and a central post. Each of the legs is pivotably coupled to the central support member, and the central support member surrounds the central post. A plurality of columns is disposed in a nested arrangement for relative axial movement in a telescopic fashion along an axis of the plurality of columns between a fully-extended position and a collapsed position. Each column has a hollow body such that when the columns are collapsed from the fully-extended position, each column substantially nests within another one of the columns. The plurality of columns is received within the central post when the plurality of columns is in the collapsed position. The tripod assembly further includes a connecting rod having a first end and a second end. The first end of the connector rod is coupled to one of the columns. A bracket assembly is coupled to the second end of the connecting rod and is configured to receive a first rung of a ladder therein.

In certain aspects of this disclosure, a bracket member is pivotably coupled to an uppermost column of the plurality of columns. The bracket member comprises a lower wall and two side walls extending upwardly from the lower wall. A channel is formed in the bracket assembly and bounded collectively by the confronting interior surfaces of the two side walls and a top surface of the lower wall. The channel is configured to receive a second rung of the ladder therein.

Certain aspects of the invention provide a ladder tripod system comprising a ladder and a tripod assembly, such as the tripod assembly described above. The ladder comprises a first stile, a second stile, and a plurality of rungs extending between the first stile and the second stile. A first rung of the ladder is configured to be received in the channel, and a second rung of the ladder, located below the first rung, is configured to be received in the bracket assembly. In some cases, the ladder is a telescoping ladder.

DETAILED DESCRIPTION OF PREFERRED EMBODIMENTS

Figure 1:
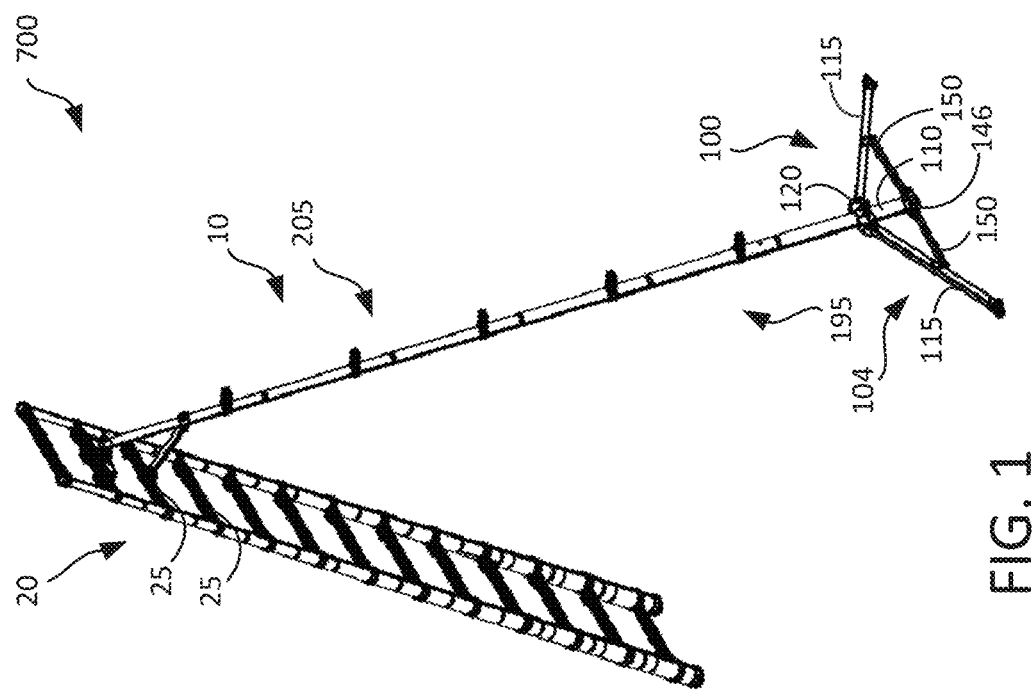
FIG. 1 is a side perspective view of a ladder tripod system in accordance with certain embodiments of the present disclosure, showing a tripod assembly supporting a telescoping ladder.
Figure 2:
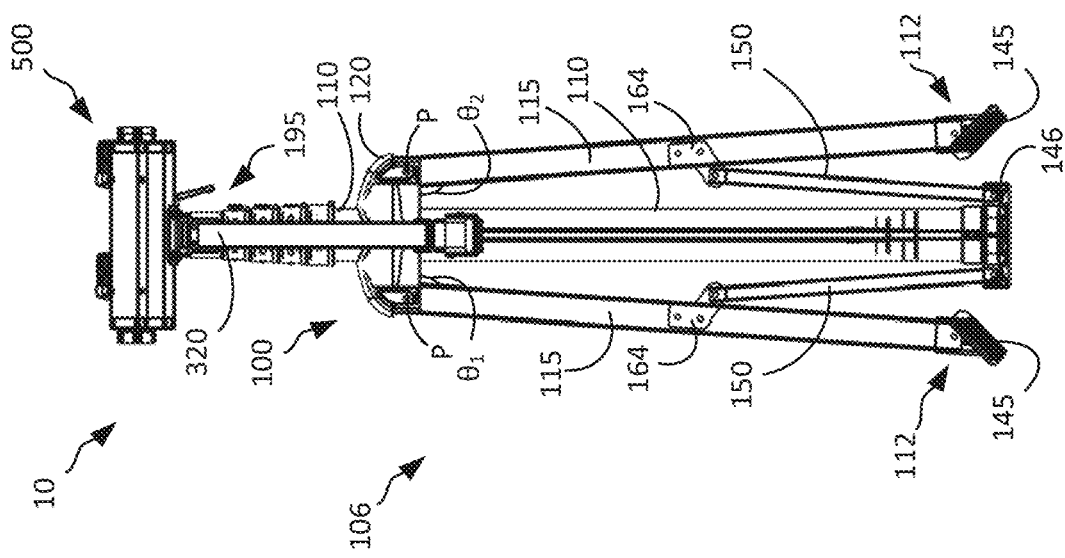
FIG. 2 is a front view of a tripod assembly in accordance with certain embodiments of the present disclosure, showing both the columns and the base assembly in collapsed positions.
Figure 3:
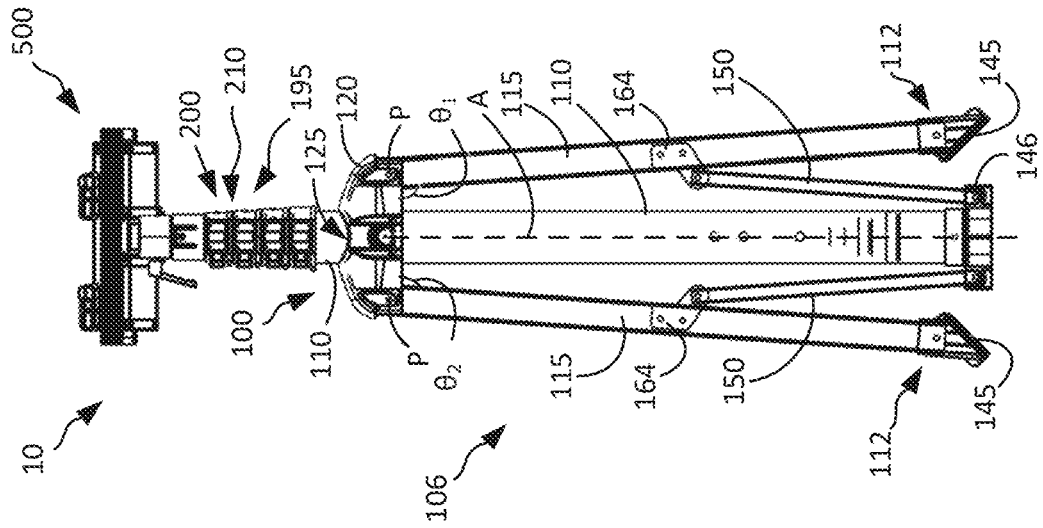
FIG. 3 is a rear perspective view of the tripod assembly of FIG. 2.
Figure 4:
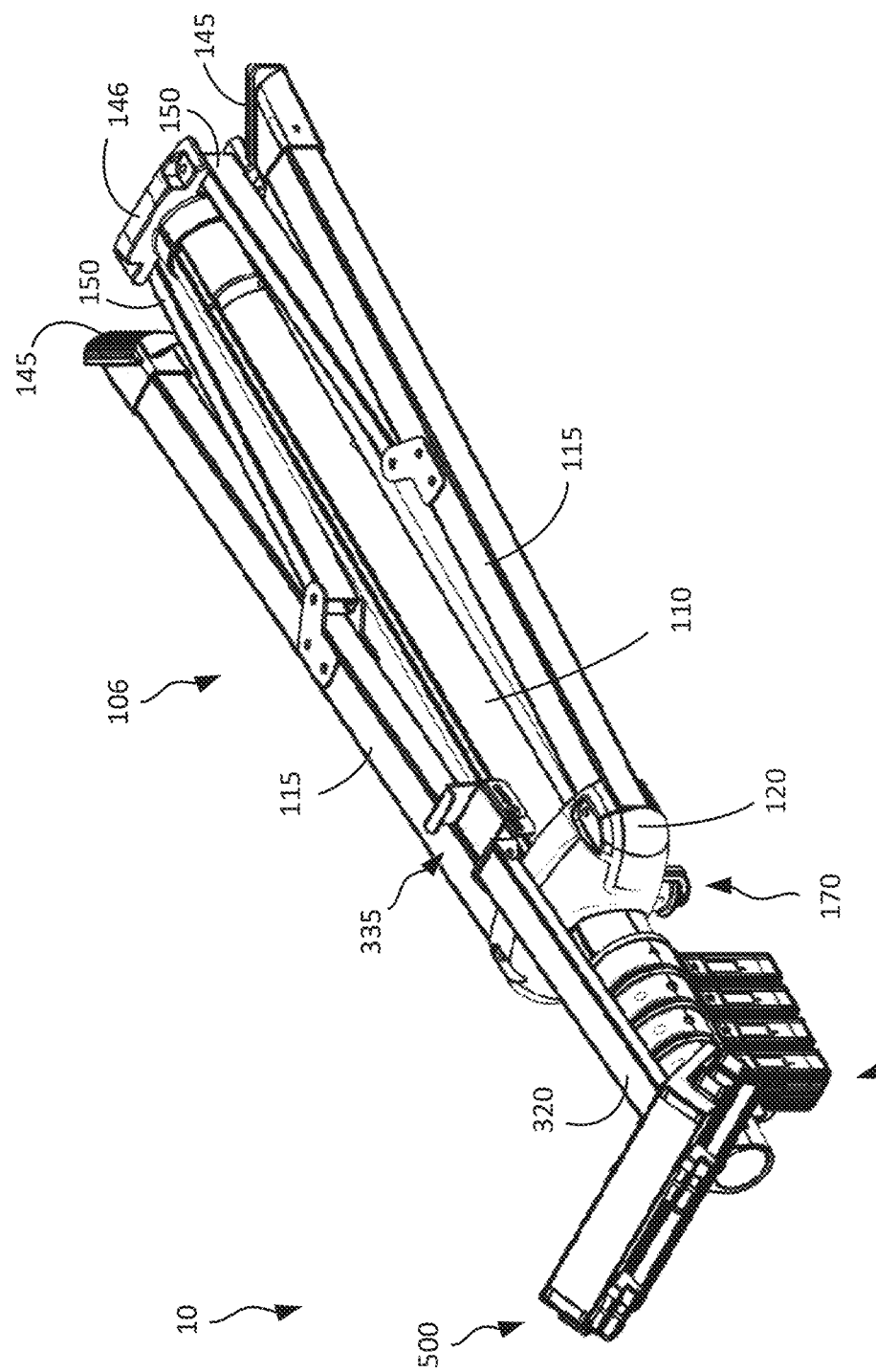
FIG. 4 is a top side perspective view of the tripod assembly of FIG. 2.
Figure 5:
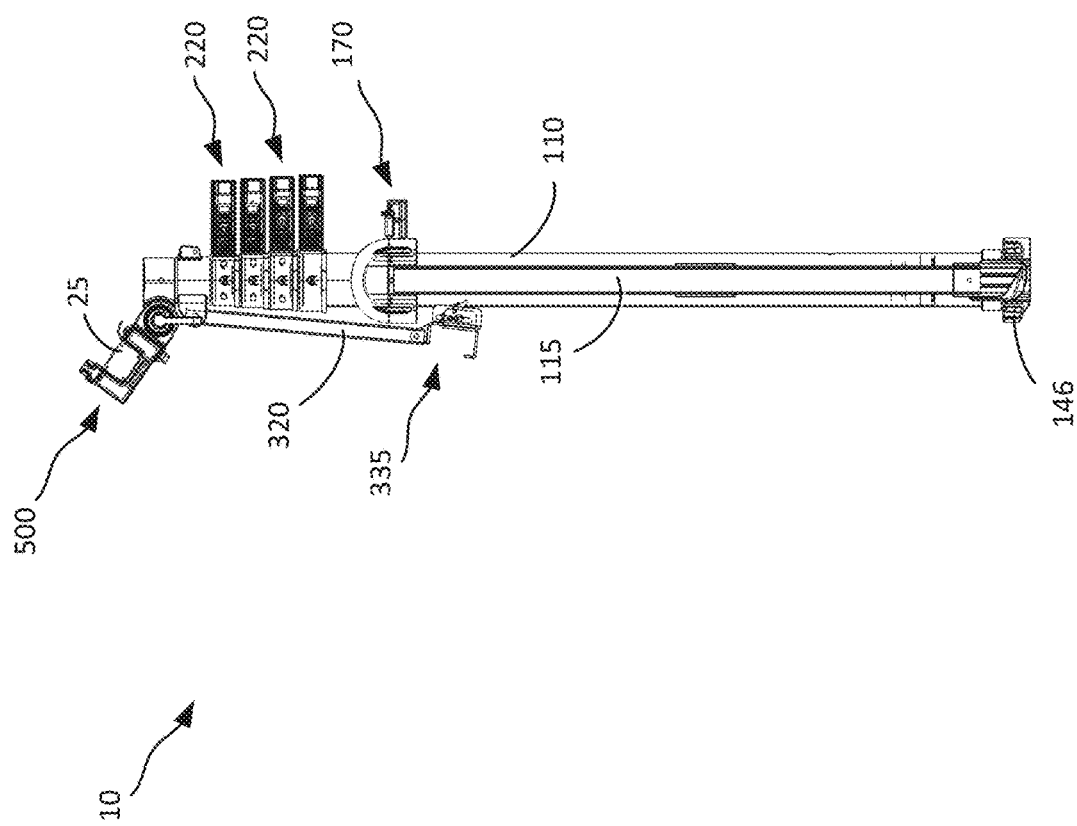
FIG. 5 is a side view of the tripod assembly of FIG. 2.
Figure 6:
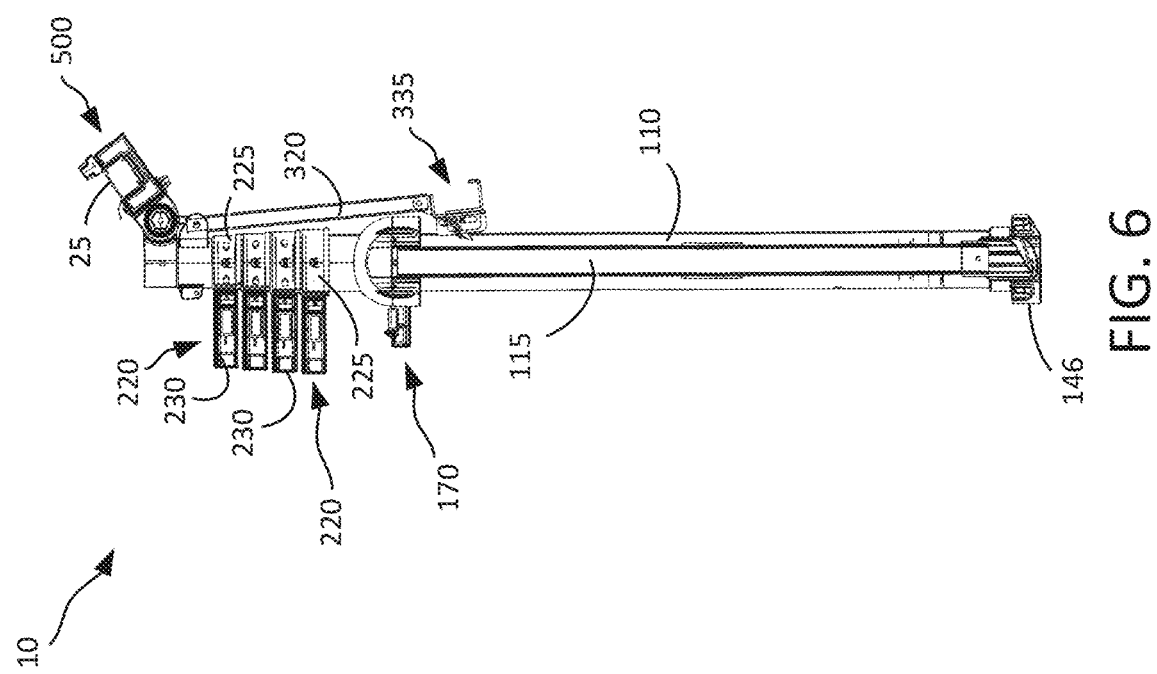
FIG. 6 is a side view of the tripod assembly of FIG. 2, showing the side of the tripod assembly opposite to that shown in FIG. 5.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Referring to the drawings, and in particular, FIG. 1, there is shown a tripod assembly of the present disclosure generally represented by reference numeral 10. As shown in FIG. 1, the tripod assembly 10 is configured to attach to multiple rungs 25 of a ladder 20 so as stabilize the ladder 20 on a surface (e.g., a ground or floor surface).

Although the present tripod assembly 10 can generally be attached to any ladder 20, it is intended to be used with a straight-frame ladder that would otherwise need to be leaned against an elevated surface (e.g., a wall, tree, or roof line) for support. Advantageously, by using the tripod assembly 10 of the present disclosure, any straight-frame ladder can be positioned and used where desired, without requiring a wall, tree, or the like to be located nearby. As non-limiting examples, the tripod assembly 10 can be used to stabilize a straight ladder (having only a single section), an extension ladder (having two upper sections that slide up and down so as to adjust a height of the ladder), or a telescoping ladder (that can be expanded to separate the columns for extension of the ladder or collapsed together for retraction of the ladder).

The illustrated tripod assembly 10 has both a base assembly 100 and an upper assembly 195. The base assembly 100 is configured to be placed upon a surface (e.g., a ground or floor surface) so as to support the tripod assembly 10 on the surface. As shown in the illustrated embodiments, the base assembly 100 comprises a central post 110, a plurality of legs 115, and a central support member 120. Each of the legs 115 is pivotably coupled to the central support member 120 at a respective pivot point P. Although only two legs 115 are shown in the drawings, three or more legs 115 are also contemplated and within the scope of the present disclosure.

Figure 7:
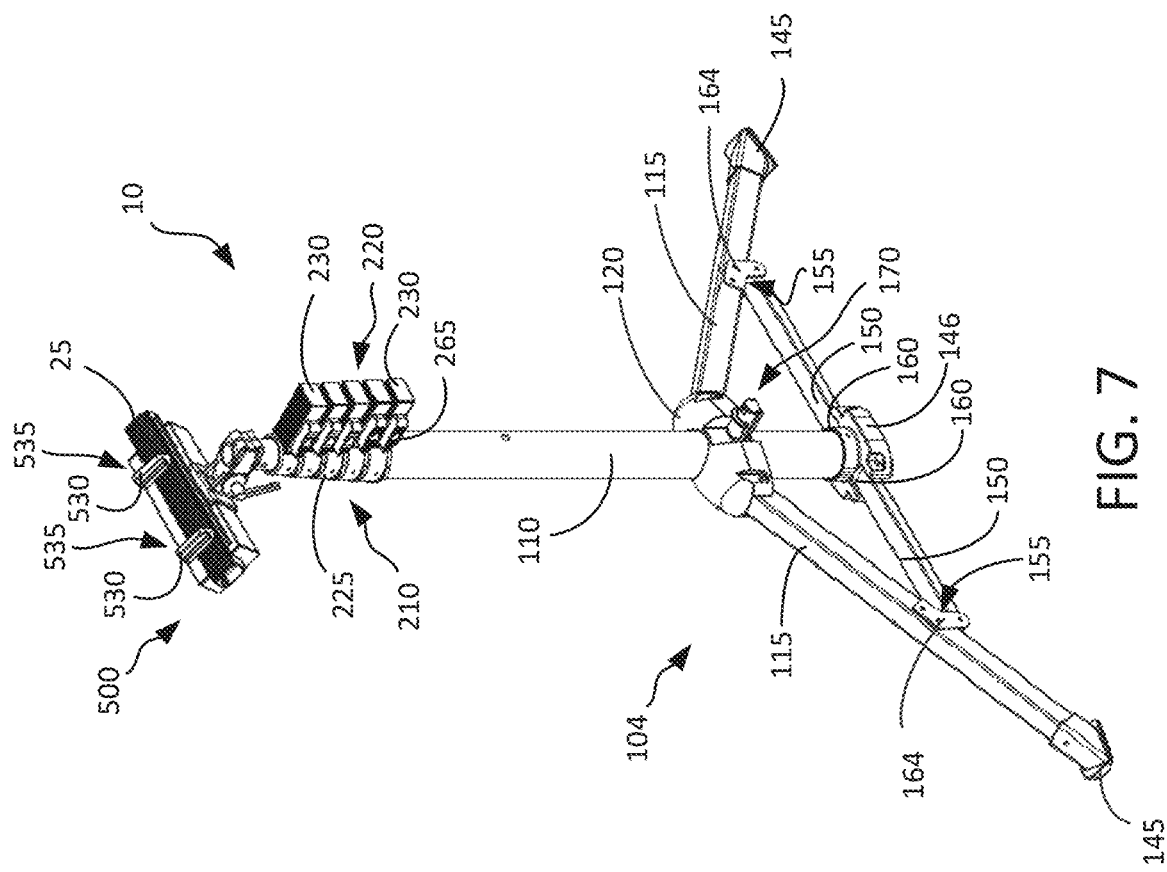
FIG. 7 is a rear perspective view of a tripod assembly in accordance with certain embodiments of the present disclosure, showing the columns in a collapsed position, the base assembly in the extended position, and the knobs in the first position securing a rung of a ladder therein, with the connecting rod removed for clarity.

The base assembly 100 is movable between an extended position 104 and a collapsed position 106. The extended position 104 is shown in FIGS. 1 and 7, whereas the collapsed position 106 is shown, e.g., in FIGS. 2-6, 9, and 10. When the base assembly 100 is in the extended position 104, the legs 115 (and stabilizing arms 150, described below) extend outward relative to the central post 110 to a greater extent than when the base assembly 100 is in the collapsed position 106. When the base assembly 100 is in the collapsed position 106, the legs 115 (and stabilizing arms 150) are generally parallel with respect to a vertical axis A of the central post 110. By applying downward force to the base assembly 100, the legs 115 are pushed outwardly and downwardly relative to the central post 110.

In some cases, the central support member 120 has an opening 125 extending therethrough. In embodiments of this nature, the central post 110 extends through the opening 125. Advantageously, this arrangement allows the central support member 120 to be slidable along the vertical axis A of the central post 110. The slidable nature of the central support member 120, in combination with the pivoting connection between the legs 115 and the central support member 120, permits selective adjustment of an angle ($\theta_1$, $\theta_2$) between each of the legs 115 and the central support member 120.

Figure 8:
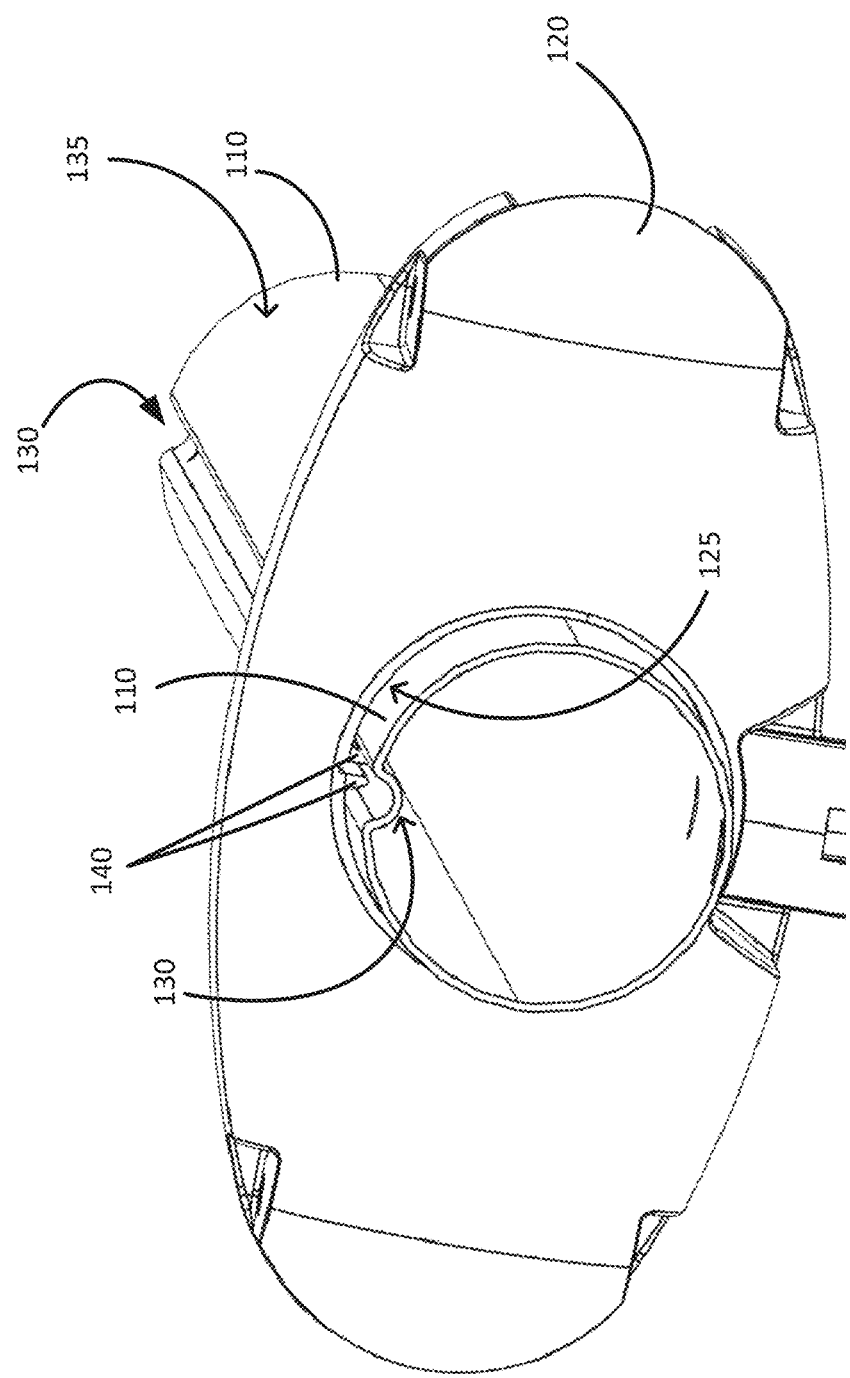
FIG. 8 is a detailed perspective view of a portion of a base assembly in accordance with certain embodiments of the present disclosure, showing the central post extending through the central support member.

To facilitate sliding of the central support member 120 relative to the central post 110, a notch 130 can optionally be formed in an outer surface 135 of the central post 110 (see FIG. 8). In such embodiments, the central support member 120 also includes one or more projections 140 configured to be received in (i.e., so as to be slidable within) the notch 130. When provided, the notch 130 extends along the vertical axis A of the central post 110.

Figure 9:
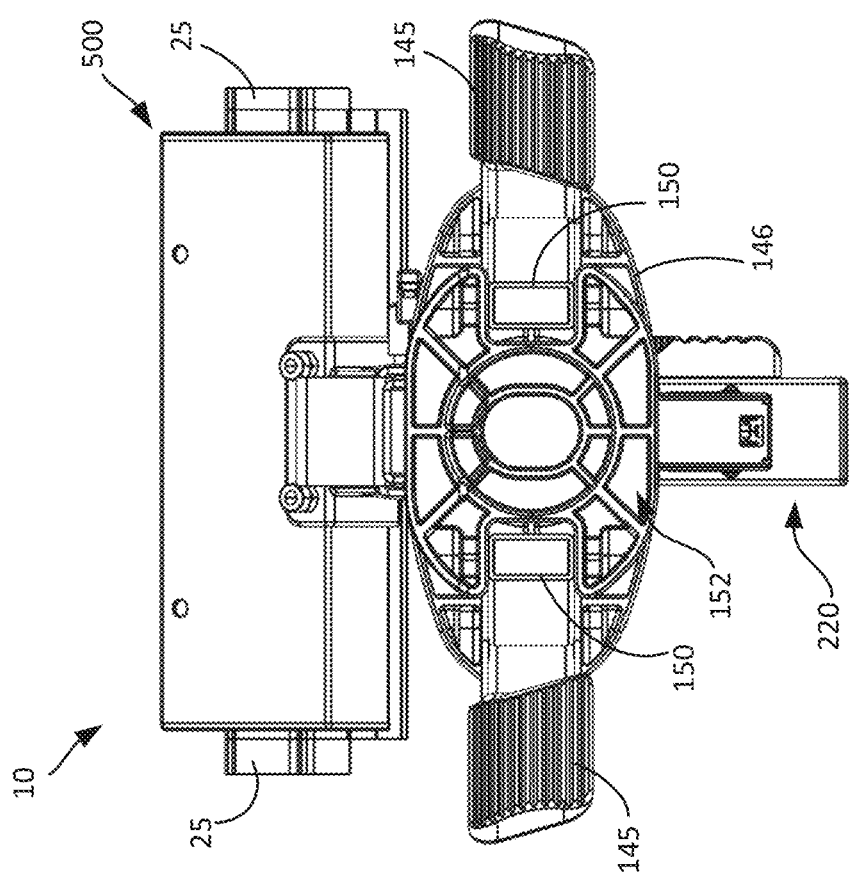
FIG. 9 is a bottom view of a tripod assembly in accordance with certain embodiments of the present disclosure.
Figure 10:
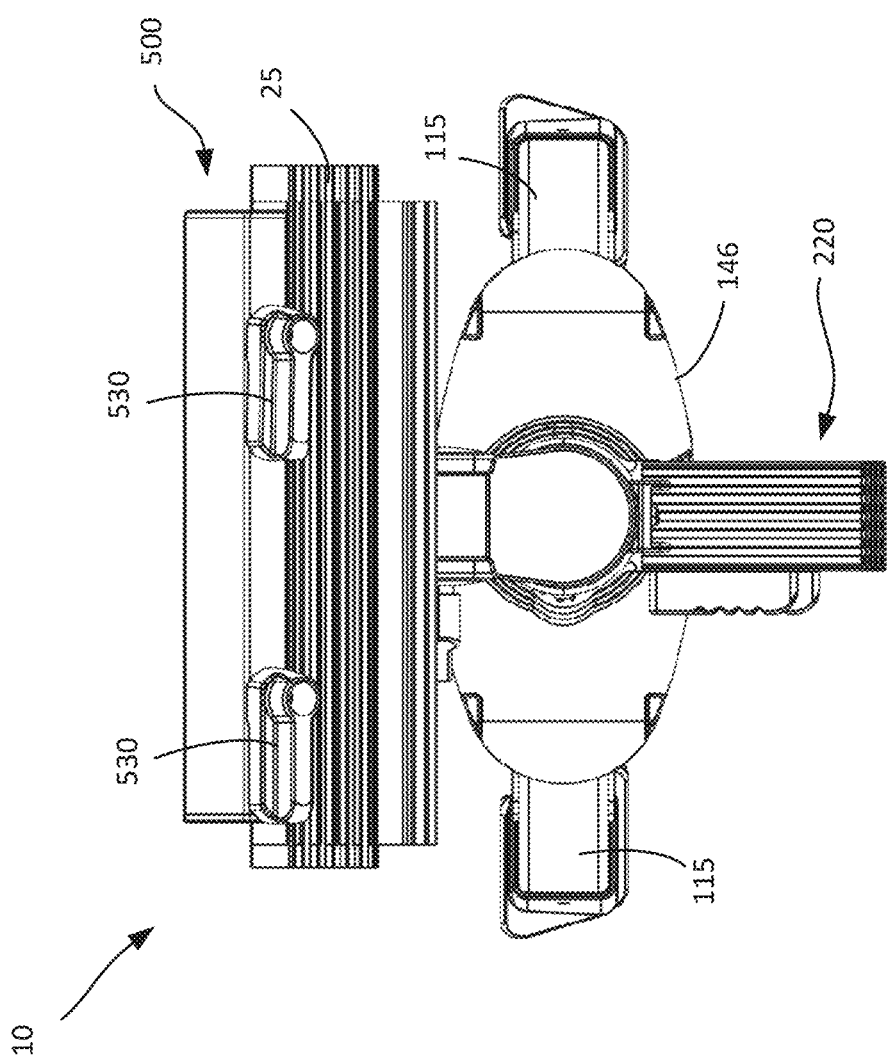
FIG. 10 is a top view of a tripod assembly in accordance with certain embodiments of the present disclosure.

In some embodiments, as shown, e.g., in FIG. 9, a bottom 112 of each leg 115 has an associated foot 145 removably attached thereto. Each foot 145 can comprise rubber, foam, or another non-slip material so as to limit sliding of each foot 145 on a surface when the feet 145 are positioned on that surface. As is perhaps best shown in the non-limiting embodiment of FIGS. 2 and 3, each foot 145 can optionally slope downwardly and outwardly in a direction away from the central post 110 when the base assembly 100 is in the collapsed position 106.

As shown, e.g., in the non-limiting embodiment of FIGS. 1-7 and 9, the central post 110 is coupled to and extends upwardly from a central base member 146. In some cases, a pad is attached to a bottom surface 152 of the central base member 146 so as to limiting sliding movement of the central base member 146 relative to a surface when the central base member 146 is positioned on that surface. In some embodiments, the pad attached to the central base member 146 comprises rubber, foam, or another non-slip material.

The illustrated base assembly 100 further comprises a pair of stabilizing arms 150. Skilled artisans will appreciate that the stabilizing arms 150 are optional features that can be included (or omitted) in any embodiment of the present disclosure. When provided, the stabilizing arms 150 assist in both folding and unfolding the base assembly 100 (i.e., in moving the base assembly 100 between the collapsed position 106 and the extended position 104). For example, the stabilizing arms 150 provide a spring-type action that facilitates unfolding of the base assembly 100.

Each of the stabilizing arms 150 has a first end 155 and a second end 160. As shown in FIG. 7, the first end 155 of each stabilizing arm 150 is pivotably attached to a respective leg 115, and the second end 160 of each stabilizing arm 150 is pivotably attached to the central base member 146. In one non-limiting embodiment, a pair of brackets 164 and a hinge pin can be used to pivotably couple each stabilizing arm 150 to its adjacently positioned leg 115.

Figure 23:
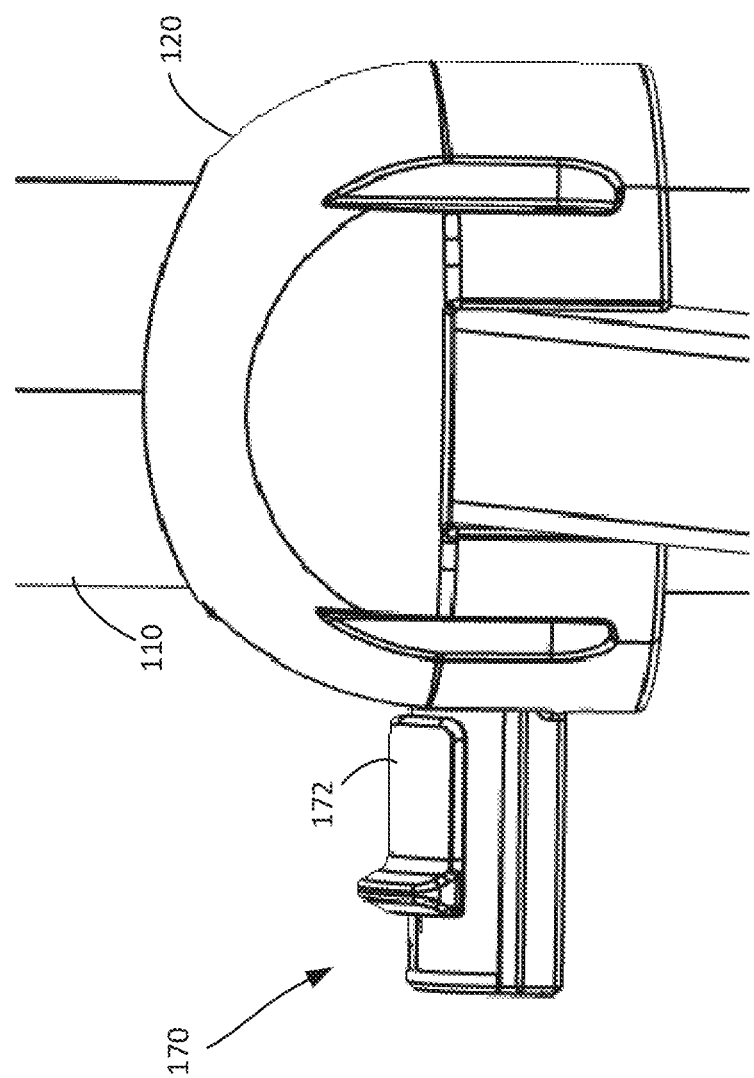
FIG. 23 is a detailed side view of a portion of a base assembly in accordance with certain embodiments of the present disclosure, showing details of the lock.
Figure 24:
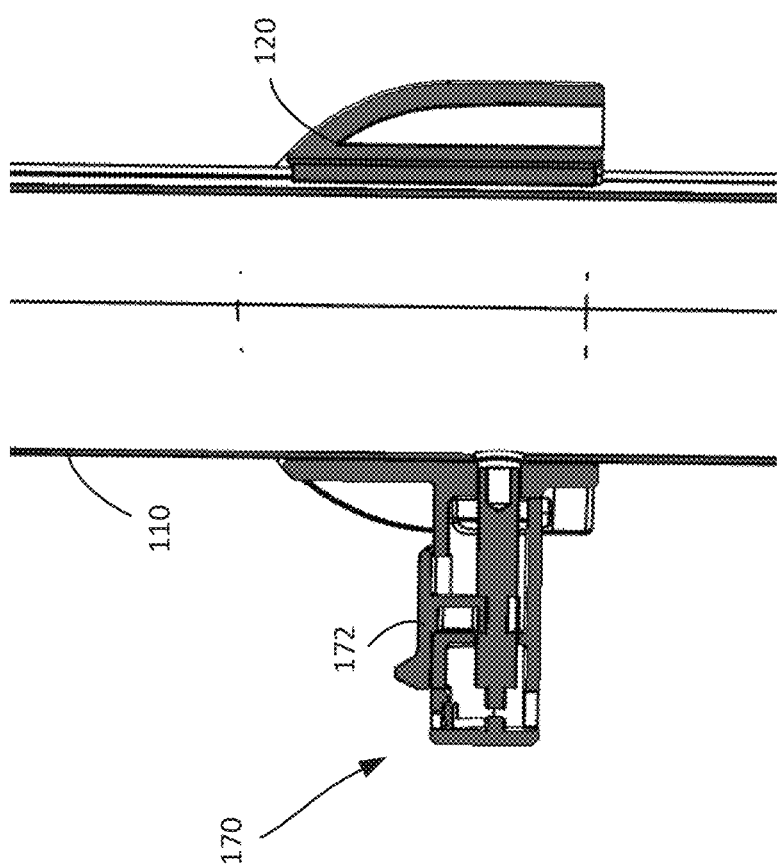
FIG. 24 is a cross-sectional view of FIG. 23.

In some embodiments, the base assembly 100 comprises a lock 170. The lock 170 is configured to limit movement of the legs 115 relative to the central support member 120. Because the stabilizing arms 150 move in response to movement of the legs 115, the lock 170 is also configured to limit movement of the stabilizing arms 150 relative to both the central base member 146 and the legs 115. An actuator 172 can be provided to selectively lock and unlock lock 170. Although details of a particular locking mechanism are shown in FIGS. 23 and 24, skilled artisans will appreciate that any conventional lock can be used for lock 170.

Figure 11:
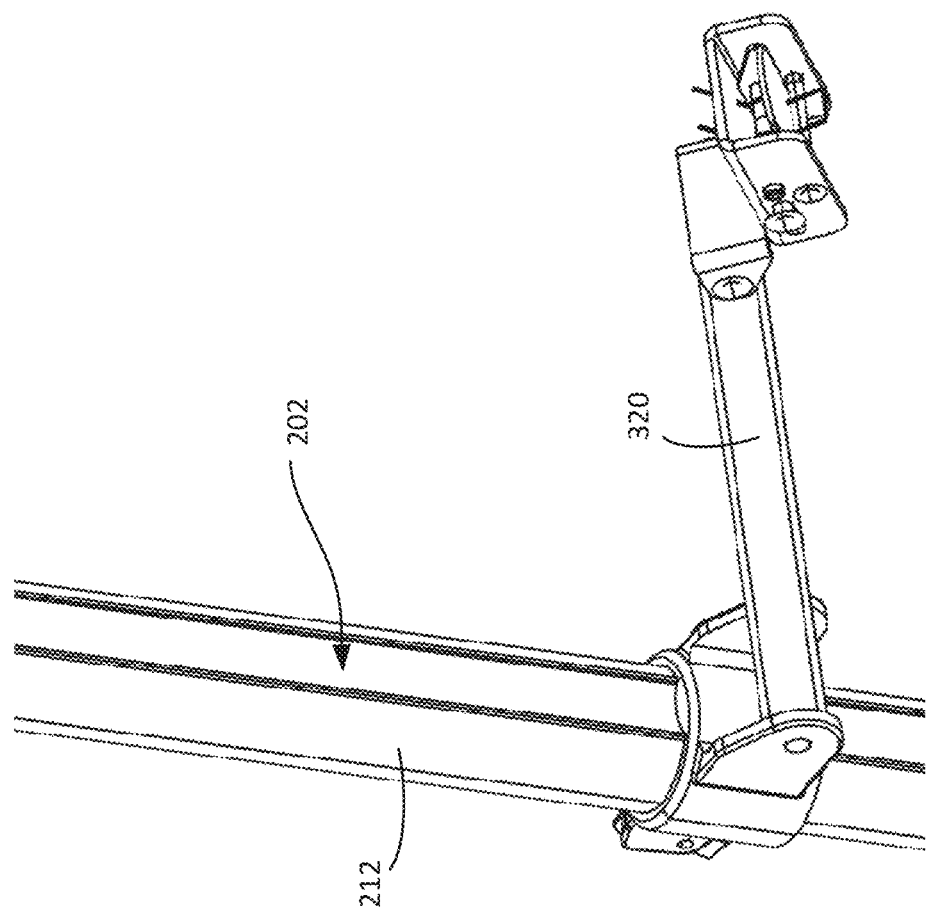
FIG. 11 is a front view of a tripod assembly of the present disclosure, showing notches formed in columns of the tripod assembly.

As described above, the tripod assembly 10 also includes an upper assembly 195. The upper assembly 195 includes a plurality of columns 200. The columns 200 are disposed in a nested arrangement for relative axial movement in a telescopic fashion along a longitudinal axis of the plurality of columns 200 between a fully-extended position 205 and a collapsed position 210. Each column 200 has a hollow body such that when the columns 200 are collapsed from the fully-extended position 205, each column 200 substantially nests within another one of the columns 200. The telescopic arrangement of the columns 200 allows a height of the tripod assembly 10 to be adjusted, which in turn allows the tripod assembly 10 to be used with ladders 20 of various heights. As illustrated in the embodiment of FIG. 11, each of the columns 200 has a notch 202 formed therein. The notches 202 allow the columns 200 to be nested relative to each so as to prevent rotation of the columns 200 relative to each other.

Figure 15:
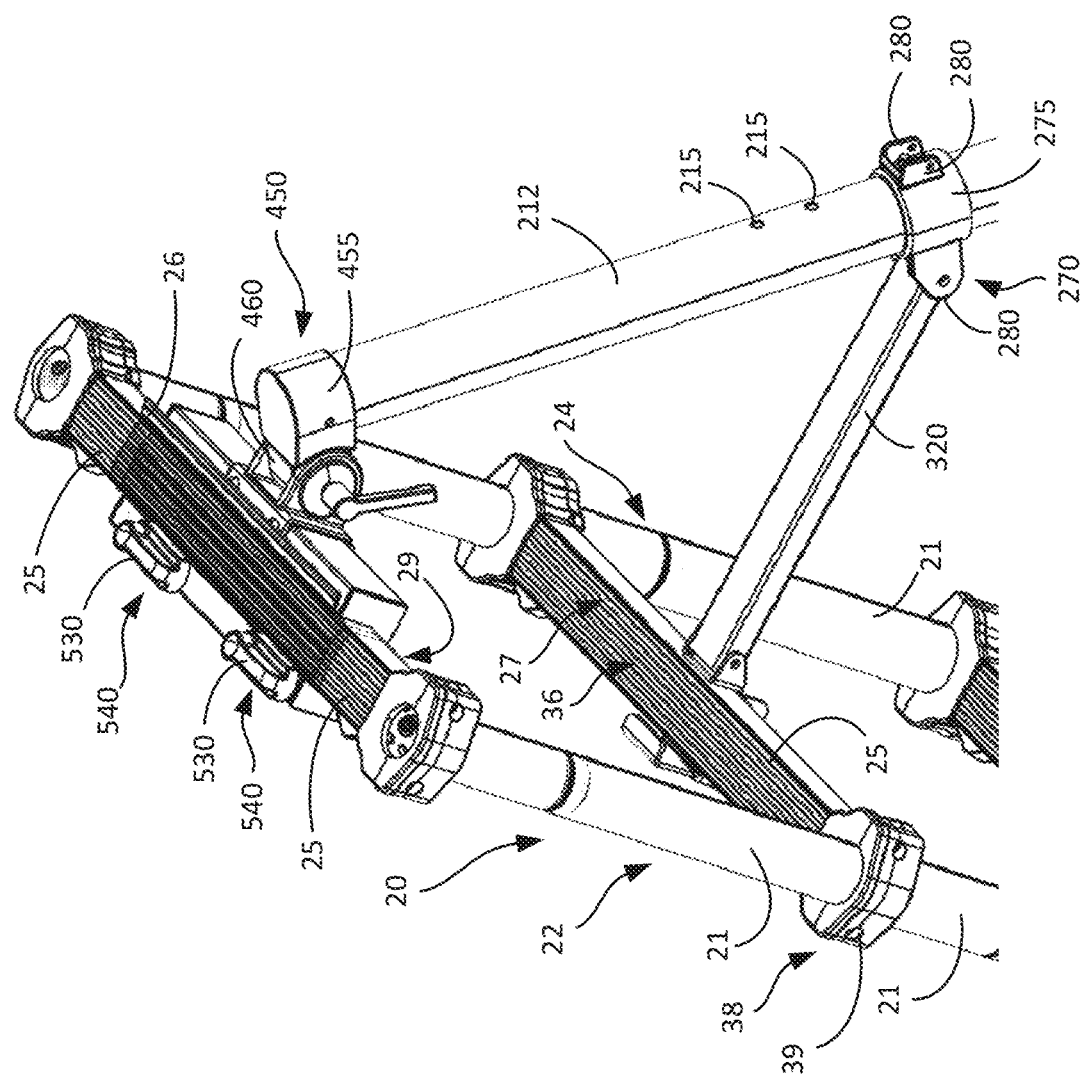
FIG. 15 is a top side perspective view of an embodiment of a portion of a tripod assembly of the present disclosure, showing the bracket member and connecting rod attached to rungs of a ladder.
Figure 16:
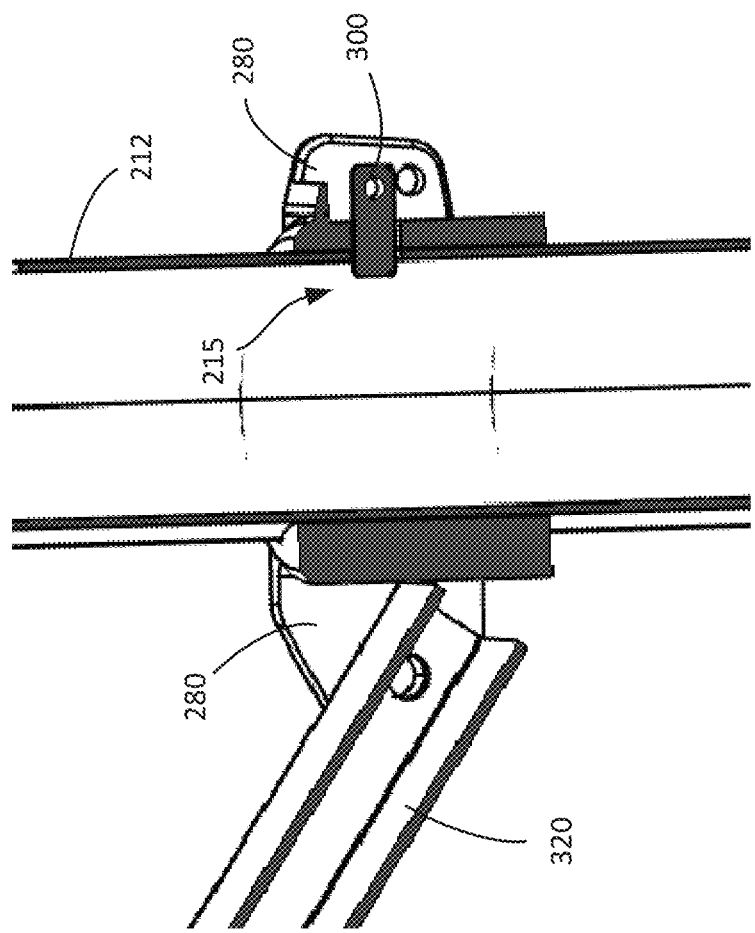
FIG. 16 is a cross-sectional view of an embodiment of a fastening assembly of the present disclosure.
Figure 17:
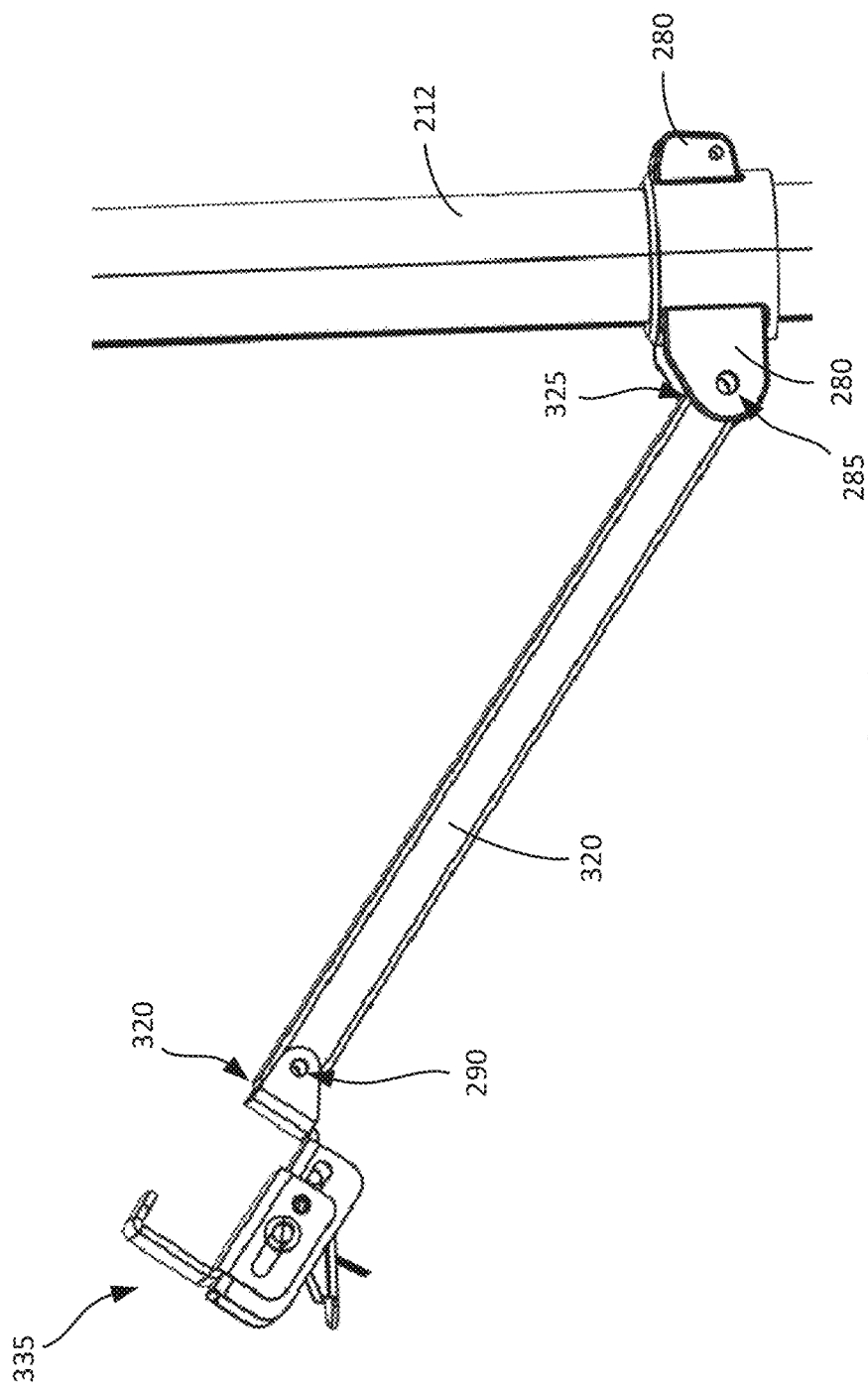
FIG. 17 is a side view of an embodiment of a fastening assembly and bracket assembly of the present disclosure.

As shown, for example in FIG. 15, a plurality of holes 215 is formed in an uppermost column 212 of the plurality of columns 200. As will be described in greater detail below, these holes 215 are configured to permit adjustment of an angle defined between the tripod assembly 10 and the ladder 20.

Figure 12:
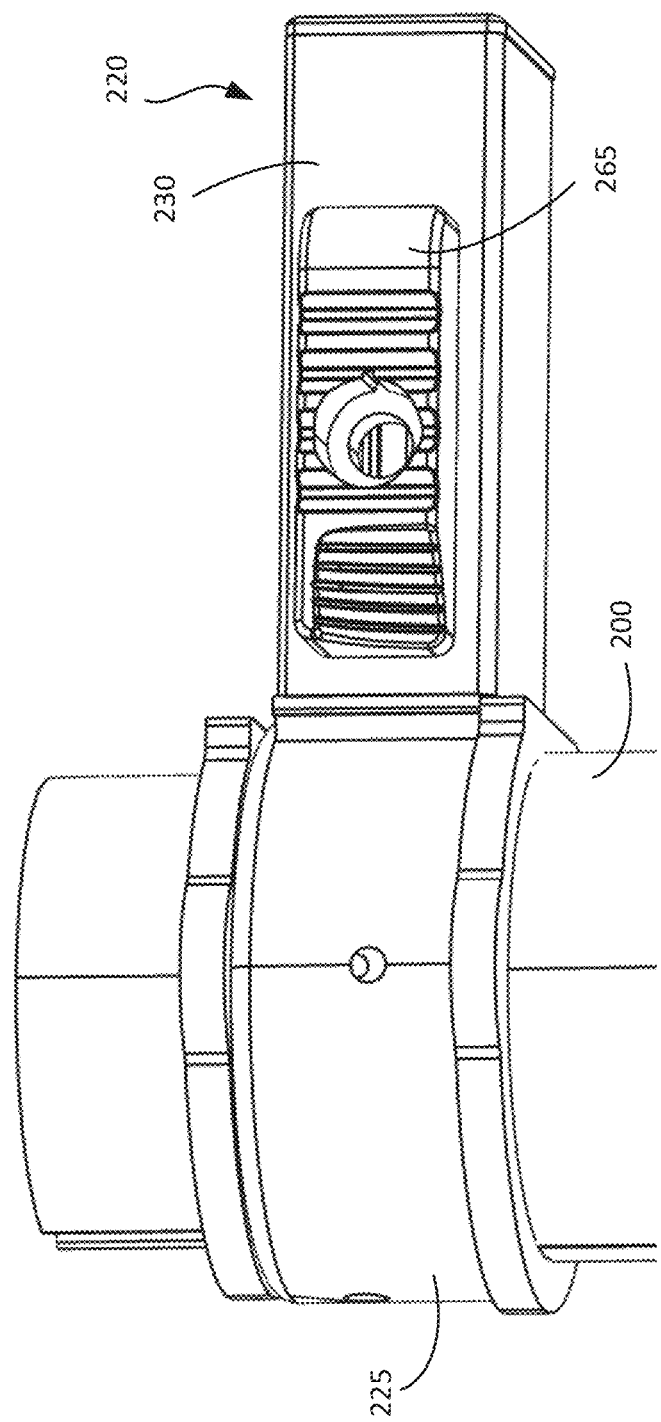
FIG. 12 is a detailed view of a connector assembly of the present disclosure, showing the connector assembly coupled to a column of the tripod assembly.
Figure 13:
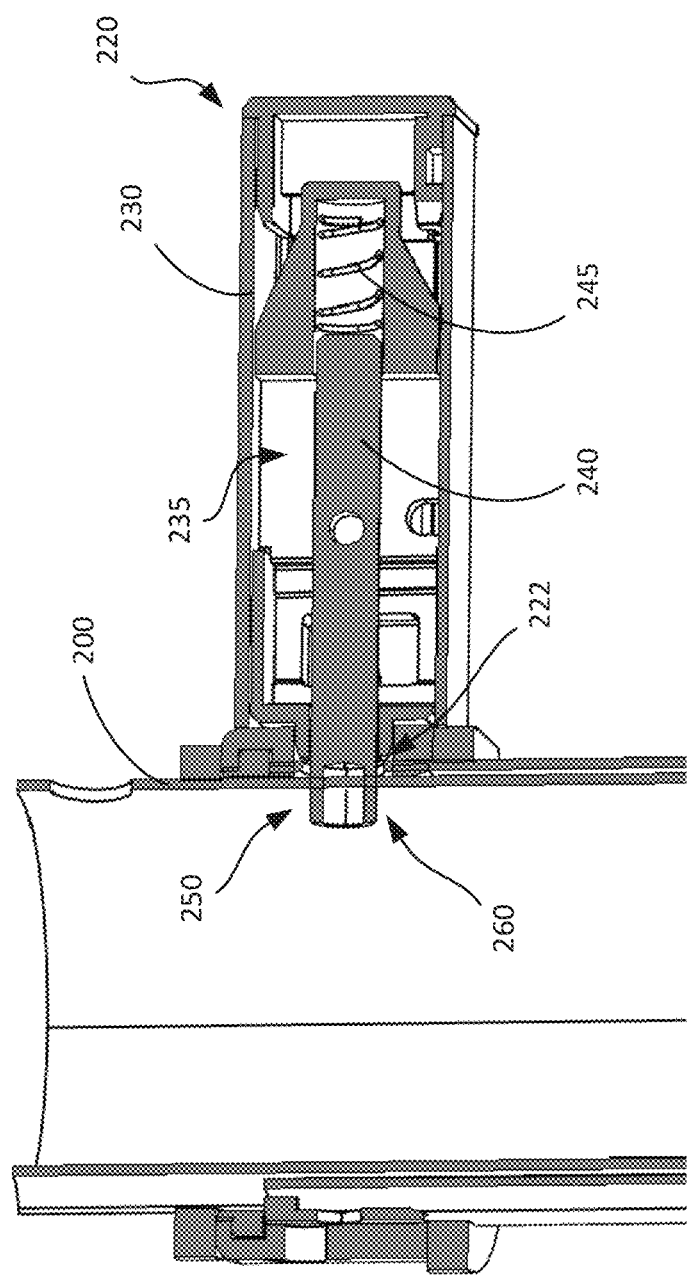
FIG. 13 is a cross-sectional view of the connector assembly and column of FIG. 11.
Figure 14:
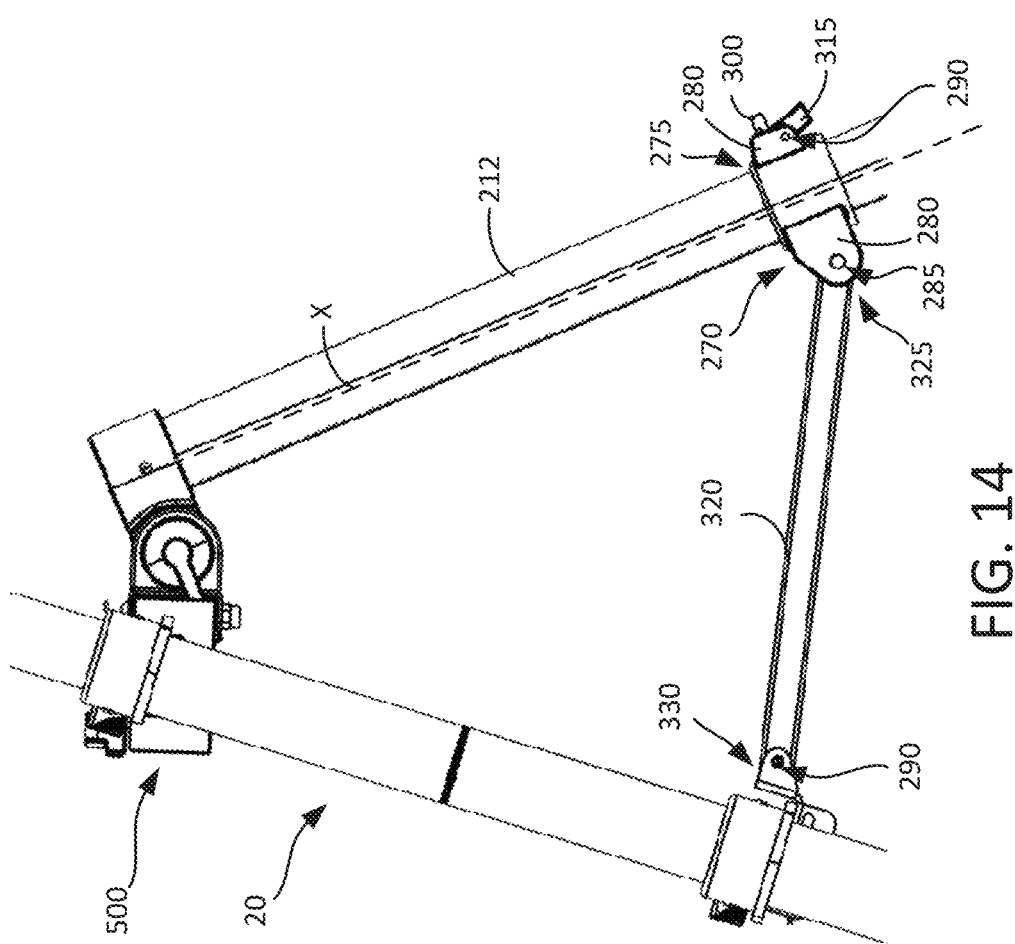
FIG. 14 is a side view of a portion of an embodiment of a tripod assembly of the present disclosure, showing the bracket member and connecting rod attached to rungs of a ladder.

The upper assembly 195 further includes a plurality of connector assemblies 220. As shown in FIGS. 12 and 13, each connector assembly 220 comprises a collar portion 225 and an extension portion 230. The collar portion 225 generally surrounds a corresponding column 200 and is in contact with the perimeter surface of the column 200. Each extension portion 230 projects outwardly from the corresponding collar portion 225. Any desired number of connector assemblies 220 can be used. For example, more or fewer connector assemblies 220 can be used than are shown in the drawings, depending on whether the ladder 20 to be used with the tripod assembly 10 is taller or shorter, respectively.

Each connector assembly 220 comprises a latch assembly 235 having a locking pin 240. Each locking pin 240 is moveable between an extended position 250 and a retracted position. When each locking pin 240 is in the extended position 250, the locking pin 240 extends into an aperture 222 defined on the associated connector assembly 220 and into openings 260 of adjacent columns 200 to selectively lock the columns 200 so as to prevent relative axial movement between the adjacent columns 200. When each locking pin 240 is in the retracted position, the locking pin 240 retracts out of the openings 260 of the adjacent columns 200 to release the adjacent columns 200 so as to permit relative axial movement between the adjacent column 200. In some embodiments of the present invention, each locking pin 240 is biased (e.g., by spring 245) to assume the extended position 250. Each spring 245 exerts a biasing force against the corresponding locking pin 240 to engage the locking pin 240 with the adjacent columns 200 in order to reversibly lock the adjacent columns 200 relative to each other. This arrangement is similar to the spring-biased locking pin described in commonly-assigned disclosure of U.S. Pat. No. 8,225,906, the entire contents of which are hereby incorporated by reference.

A plurality of actuators 265 is also provided. Each actuator 265 is coupled to a respective locking pin 240 and disposed on an extension portion 230 of a respective one of the connector assemblies 220. Each actuator 265 is operatively coupled to a corresponding locking pin 240 such that when actuated, the corresponding locking pin 240 moves from the extended position 250 to the retracted position. In more detail, each actuator 265 is moveable along the respective extension portion 230 (e.g., by a thumb of a user), in a direction that is generally aligned with a direction in which the respective extension portion 230 extends, away from the respective collar portion 225, in order to retract the respective locking pin 240 against the biasing force of the spring 245 and thereby allow an upper one of the adjacent columns 200 to retract and collapse within a lower one of the adjacent columns 200.

The upper assembly 195 also includes a fastening assembly 270, portions of which are shown in the non-limiting embodiments of FIGS. 14-17. The fastening assembly 270 comprises a collar 275 and two pairs of tabs 280. The collar 275 generally surrounds the uppermost column 212 and is slidable along a length of the uppermost column 212. Each tab of each pair of tabs 280 is spaced apart and positioned parallel with respect to other tab of the pair.

The fastening assembly 270 further comprises a latch assembly 295 having a first locking pin 300. The first locking pin 300 is moveable between a first position 310 and a second position. When the first locking pin 300 is in the first position 310, the first locking pin 300 extends into a selectable one of the holes 215 to selectively lock the fastening assembly 270 to the uppermost column 212 so as to restrict slidable movement of the fastening assembly 270 relative to the uppermost column 212. When the first locking pin 300 is in the second position, the first locking pin 300 retracts out of the selected hole 215 of the uppermost column 212 to release the fastening assembly 270 so as to allow slidable movement of the fastening assembly 270 relative to the uppermost column 212. The fastening assembly 270 can include a spring that exerts a biasing force against the first locking pin 300 to engage the first locking pin 300 with the selected hole 215 in order to reversibly lock the fastening assembly 270 in position relative to the uppermost column 212.

An actuator 315 is coupled to the first locking pin 300 of the fastening assembly 270. Actuator 315 is pivotably coupled to the fastening assembly 270 at a first pivot point 285 such that actuator 315 is moveable with respect to the collar 275 and associated tabs 280. At least a portion of actuator 315 is movable in a direction away from the collar 275 in order to retract the spring-biased first locking pin 300 against a biasing force of the spring and thereby allow the fastening assembly 270 to slide along the length of the uppermost column 212.

Figure 18:
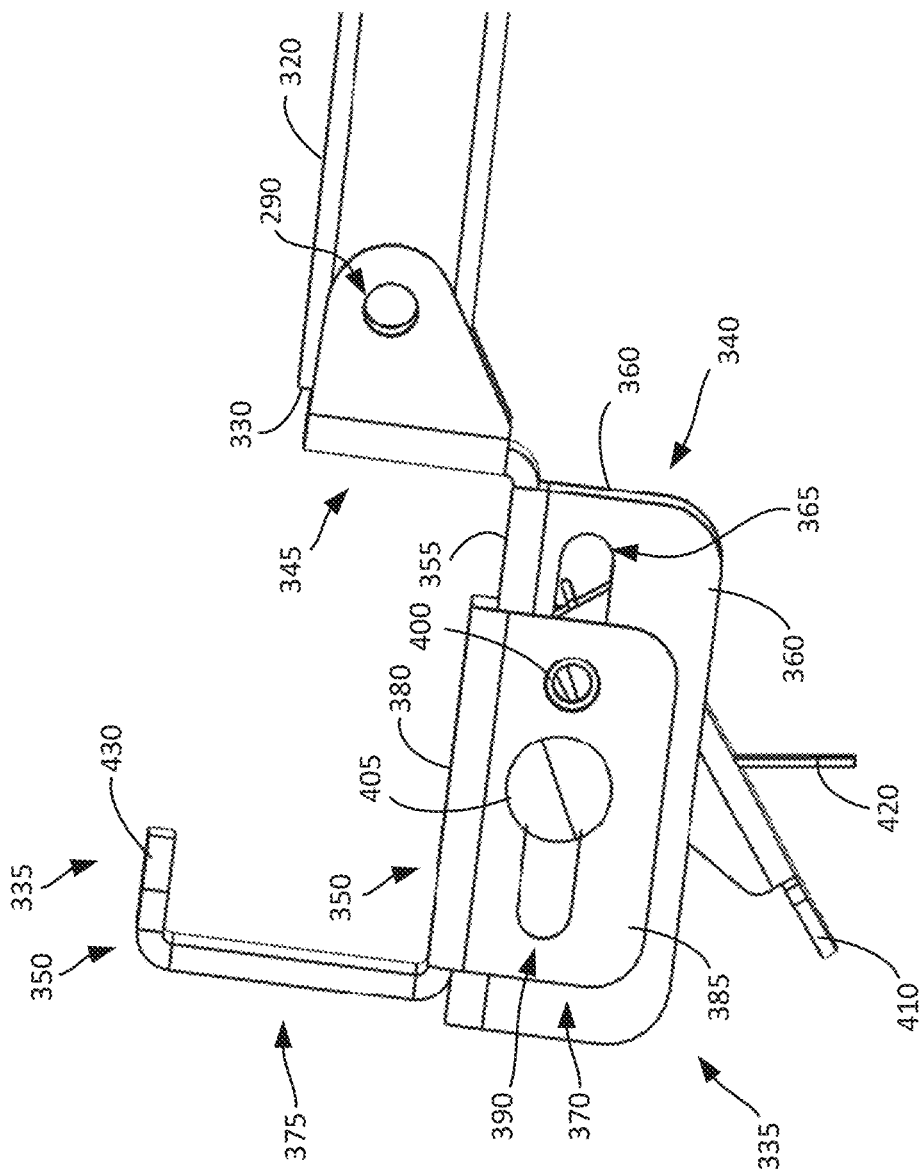
FIG. 18 is a detailed side view of the bracket assembly of FIG. 16.

The upper assembly 195 also includes a connecting rod 320 having a first end 325 and a second end 330. The first end 325 of the connecting rod 320 is pivotably coupled to the fastening assembly 270 at pivot point 285. As shown in the non-limiting embodiment of FIG. 18, a bracket assembly 335 is pivotably coupled to the second end 330 of the connecting rod 320 at pivot point 290. As described in greater detail below, the bracket assembly 335 is configured to receive and secure a selectable rung 25 of the ladder 20 therein.

The bracket assembly 335 includes a first portion 340, a second portion 345, and a third portion 350. Both the second portion 345 and the third portion 350 are coupled to the first portion 340, and the second portion 345 is pivotally coupled to the second end 330 of the connecting rod 320. In some cases, a pivot pin is used to pivotally couple the second portion 345 of the bracket assembly 335 to the second end 330 of the connecting rod 320.

The first portion 340 of the bracket assembly 335 includes a top wall 355 and two side walls 360 that extend down from the top wall 355 and that are parallel with respect to each other. Each side wall 360 has a respective channel 365 formed therein. These two channels 365 are opposed (i.e., positioned directly across from each other on opposite sides of the first portion 340).

The third portion 350 of the bracket assembly 335 is slidably coupled to the first portion 340 of the bracket assembly 335 such that the third portion 350 slides relative to the first portion 340. In particular, the third portion 350 is movable toward the second portion 345 such that the third portion 350 is slidable between a first position and a second position. The third portion 350 is located nearer to the connecting rod 320 when in the first position than when in the second position. When the third portion 350 is in the first position, it is configured to secure a selected rung 25 of the ladder 20 within the bracket assembly 335.

The third portion 350 includes a base member 370 coupled to a projecting member 375. The base member 370 has a top wall 380 and two side walls 385 that extend down from the top wall 380. The base member 370 is attached to the first portion 340 of the bracket assembly 335 in such a manner that the top wall 380 of the base member 370 surrounds the top wall 355 of the first portion 340 of the bracket assembly 335, and the side walls 385 of the base member 370 each surround a respective side wall 360 of the first portion 340 of the bracket assembly 335. The selected rung 25 of the ladder 20 is positioned on top of top wall 380 when the third portion 350 is in the second position. The third portion 350 is then slid from the second position to the first position so as to secure the selected rung 25 within the bracket assembly 335.

A respective channel 390 is formed in each of the side walls 385 of the base member 370. The two channels 390 are opposed (i.e., positioned directly across from each other on opposite sides of the base member 370). A first pin 400 extends through each of channels 365, and a second pin 405 extends through each of channels 390. This arrangement permits sliding movement of the third portion 350 of the bracket assembly 335 relative to the second portion 365 of the bracket assembly 335, while also ensuring that these two portions 350, 365 remain coupled together.

The projecting member 375 of the third portion 350 of the bracket assembly 335 includes a flange 430 that extends over the base member 370. When the selected rung 25 of the ladder 20 is received in the third portion 350 of the bracket assembly 335 and the third portion 350 is in the first position, the flange 430 extends over a top of the selected rung 25 so as to secure the rung 25 within the locking assembly 335.

Figure 19:
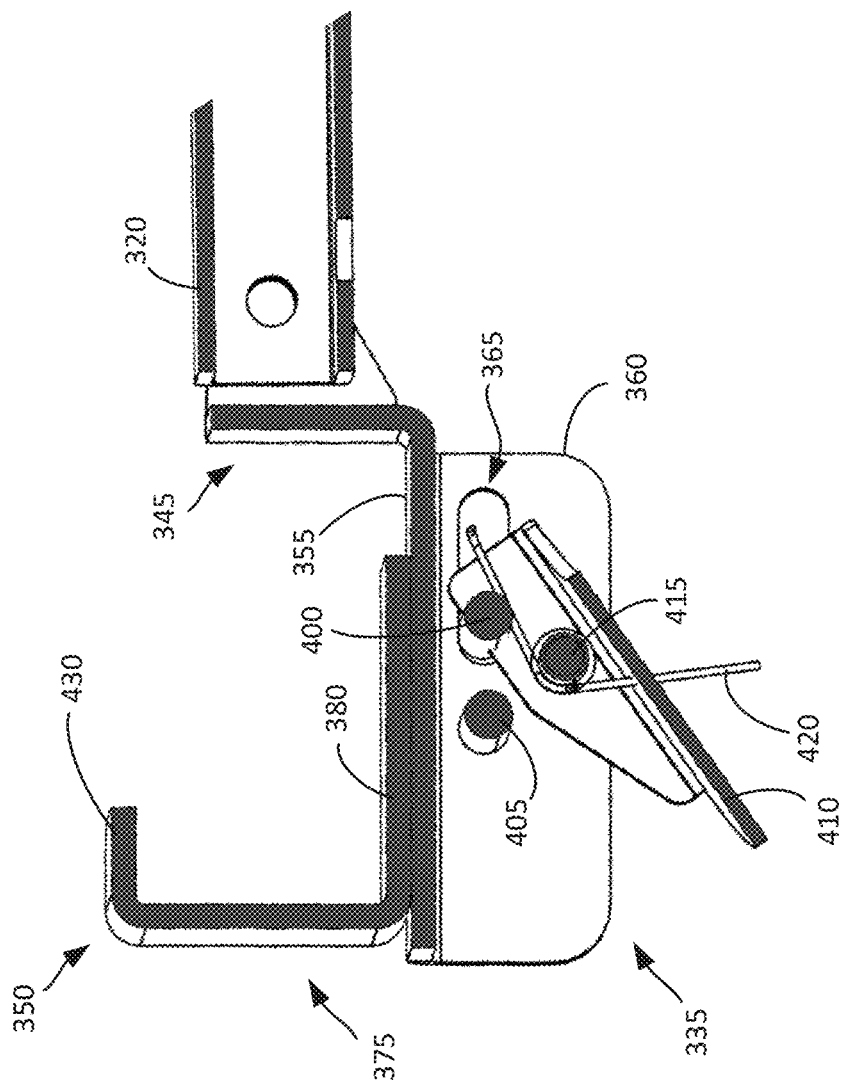
FIG. 19 is a cross-sectional view of the bracket assembly of FIG. 17.

A tongue 410 is provided that selectively permits or restricts sliding movement of the third portion 350 relative to the first portion 340 of the locking assembly 335. As shown in the non-limiting embodiment of FIG. 19, the tongue 410 can be pivotably coupled to a third pin 415 that extends between side walls 360. In some cases, a spring 420 is provided that exerts a biasing force against the first pin 400 in order to reversibly lock the third portion 350 of the bracket assembly 355 relative to the first portion 340 of the bracket assembly 355.

Figure 22:
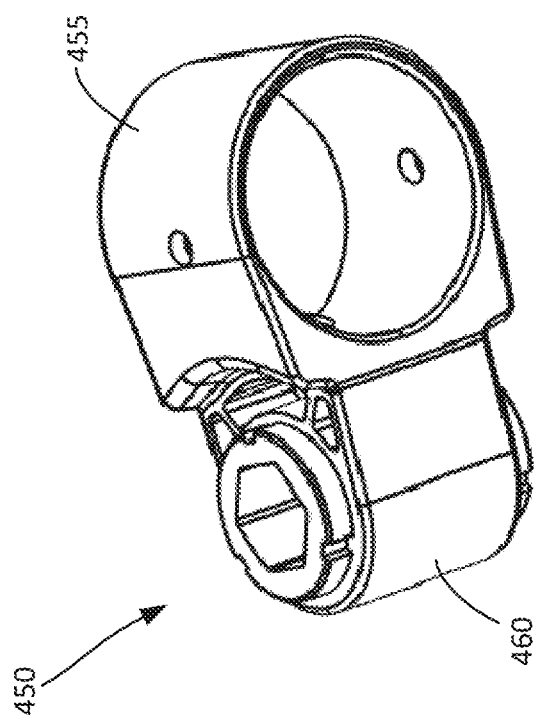
FIG. 22 is a bottom perspective view of the coupling assembly in accordance with certain embodiments of the present disclosure.

As shown in the embodiment of FIG. 22, the upper assembly 195 can also include a coupling assembly 450 that includes a base portion 455 and a projecting portion 460. The projecting portion 460 extends outwardly from a side of the base portion 455. The base portion 455 is coupled to the uppermost column 212 at or near a top end 204 of the uppermost column 212. In some cases, the base portion 455 has a closed top end 456 that surrounds the top end of the uppermost column 212.

Figure 20:
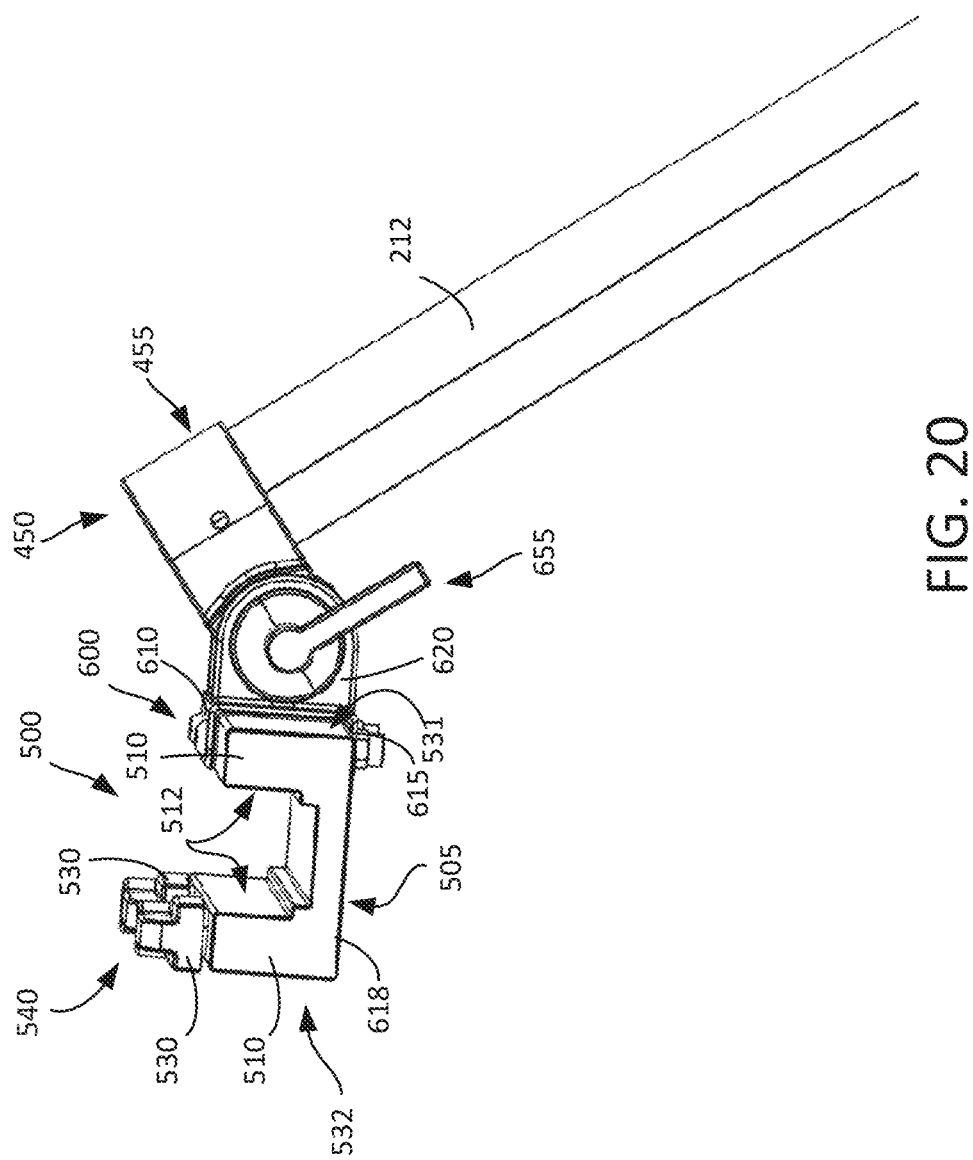
FIG. 20 is a perspective side view of an embodiment of the present disclosure, showing the bracket member attached to the uppermost column.
Figure 21:
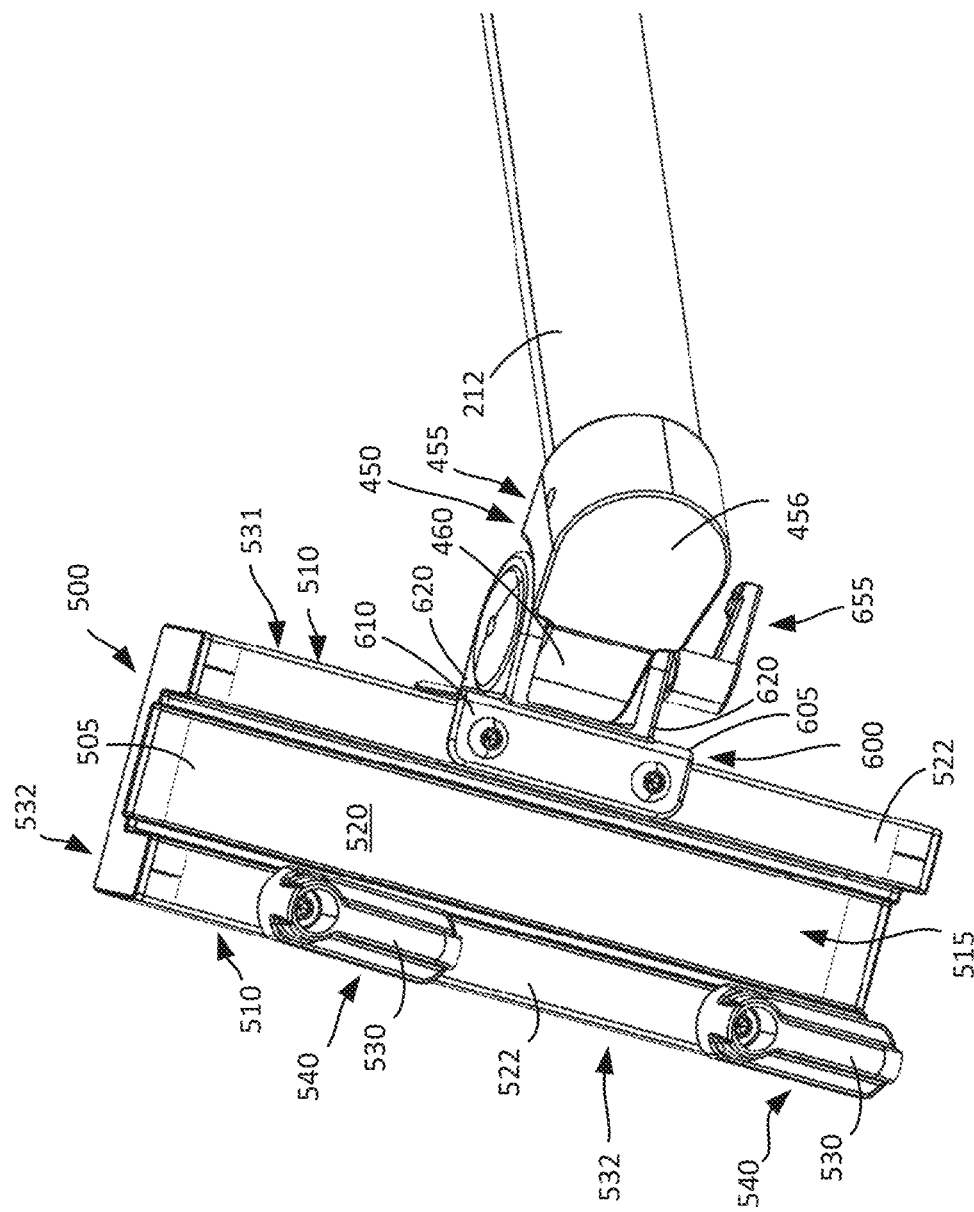
FIG. 21 is a top view of the bracket member of FIG. 19.

As shown in the non-limiting embodiment of FIGS. 20 and 21, a coupling assembly 450 pivotably couples the bracket member 500 to the uppermost column 212. As shown in these figures, the bracket member 500 can comprise a lower wall 505 and two side walls 510 extending upwardly from the lower wall 505. The side walls 510 are oriented parallel with respect to each other so as to define confronting interior surfaces 512. As described below, the bracket member 500 is similar to the bracket assembly 335 in that both are configured to receive a selectable rung 25 of the ladder 20 therein. In particular, the bracket member 500 receives one rung 25 of the ladder 20, while the bracket assembly 335 receives another rung 25 of the same ladder 20. The rung 25 received in the bracket member 500 preferably is a rung located immediately below the rung 25 received in the bracket assembly 335. This arrangement helps to stabilize the ladder 20 via both the bracket member 500 and the bracket assembly 335.

A channel 515 is formed in the bracket member 500 and is bounded collectively by the confronting interior surfaces 512 of the two side walls 510 and a top surface 520 of the lower wall 505. A pad can optionally be mounted in the channel 515 such that when a rung 25 of the ladder 20 is received in the channel 515, the pad is located between the receiver 500 and the rung 25. The pad can comprise a non-slip material, such as foam, rubber, or the like so as to increase friction with a rung 25 positioned in the channel 515 (as opposed to when no pad is used). Such a pad will also help to limit lateral sliding movement of a rung 25 when the rung 25 is received in the channel 515. Optionally, the material for the pad can also be flame-resistant, oil-resistant, solvent-resistant, and suitable for outdoor use.

At least one knob 530 is rotatably coupled to the top edge 522 of one of the side walls 510 of the receiver 500. The at least one knob 530 can include only one knob, or can include two or more knobs. The side walls 510 comprise a first side wall 531 and a second side wall 532. The second side wall 532 is located further from the coupling assembly 450 than is the first side wall 531. In some embodiments, the at least one knob 530 is coupled to the second side wall 532. By positioning the at least one knob 530 on the second side wall 532 (and away from the coupling assembly 450), the at least one knob 530 is also spaced from a flange 26 of the selected rung 25 when the selected rung 25 is positioned in the receiver 500. This arrangement helps ensure that the rung 25 will not interfere with rotation of the at least one knob 530.

The at least one knob 530 is rotatable between a first position 535 and a second position 540. When the at least one knob 530 is in the first position 535, a portion 545 of each knob 530 extends over (i.e., above) the channel 515 such that the at least one knob 530 is configured to abut a rung 25 of the ladder 20 to secure the rung 25 in the channel 515 (see FIG. 5). When the at least one knob 530 is in the second position 540, no portion of the at least one knob 530 extends over the channel 515.

As shown in the illustrated embodiments, a bracket assembly 600 can be used to couple the bracket member 500 and the coupling assembly 450. In some cases, bracket assembly 600 is coupled to the first side wall 531 of the bracket member 500. Bracket assembly 600 comprises a main portion 605, a top flange 610, a bottom flange 615, and a pair of extension tabs 620. The top flange 615 extends onto the top edge 522 of the first side wall 531, and the bottom flange 615 extends onto a bottom edge 618 of the lower wall 505. Each of the extension tabs 620 extends outwardly from the main portion 605 of bracket assembly 600 in a direction perpendicular (or substantially perpendicular) to the main portion 605.

The tripod assembly 10 further includes an adjusting mechanism 650 coupled to the uppermost column 212 and the bracket member 500. The adjusting mechanism 650 enables pivotable movement of the bracket member 500 relative to the uppermost column 212 so as to selectively adjust an angle that the tripod assembly 10 forms with the ladder 20. In some cases, the adjusting mechanism 650 includes a limit stop so as to limit rotation of the tripod assembly 10 to a maximum angle of about 90 degrees from the ladder 20. In certain embodiments, the adjusting mechanism 650 includes a clamping lever 655 that can be selectively tightened down (i.e., clamped) so as to restrict rotation of the clamping lever 655, thereby also restricting pivotable movement of the bracket member 500 relative to the uppermost column 212.

Figure 25:
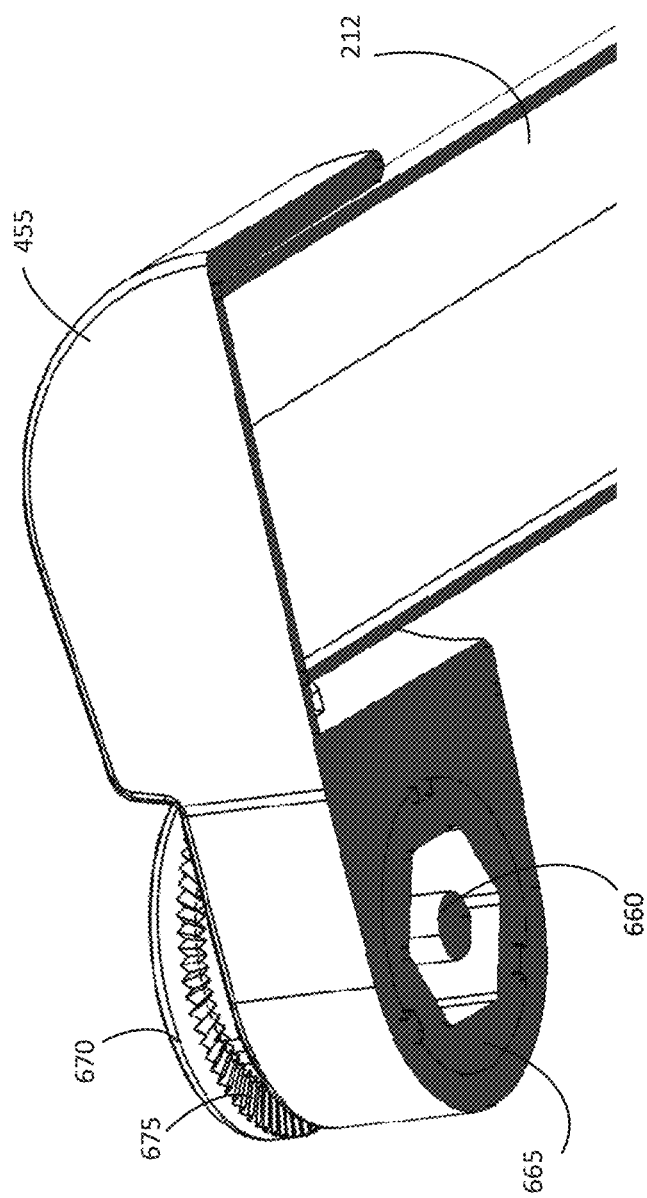
FIG. 25 is a perspective partial cross-sectional view of a portion of a tripod assembly of the present disclosure, showing an adjusting mechanism attached to a coupling assembly.
Figure 26:
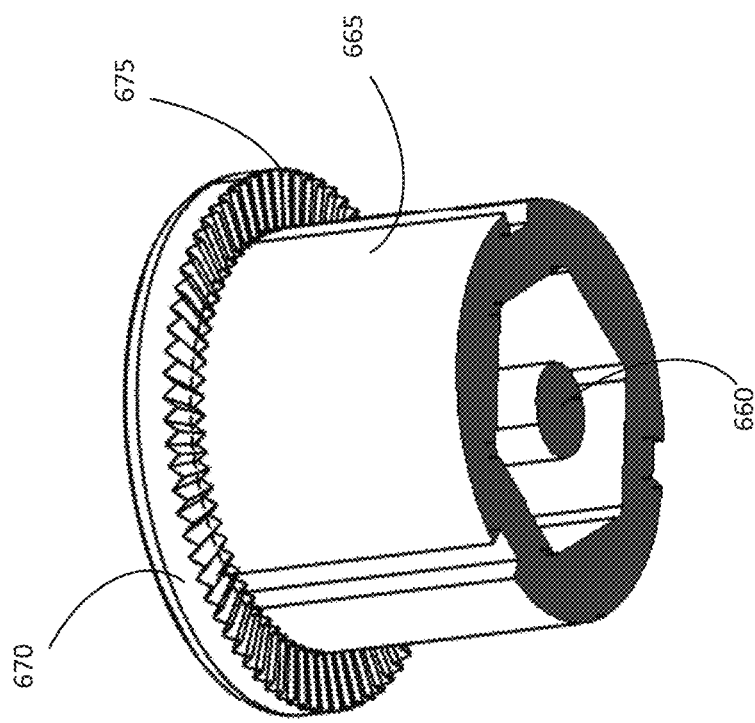
FIG. 26 is a detailed view of a portion of an adjusting mechanism of the present disclosure.
Figure 27:
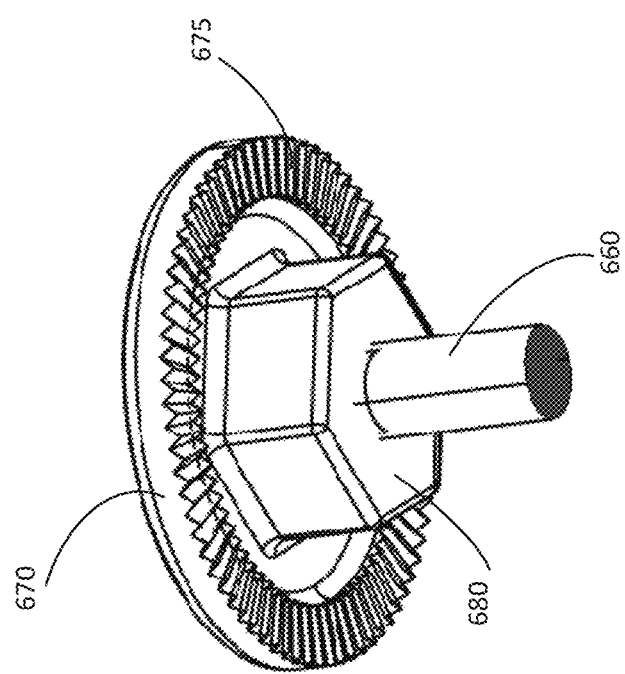
FIG. 27 is a detailed view of a portion of the adjusting mechanism of FIG. 26.

In the embodiments illustrated in FIGS. 25-27, the adjusting mechanism 650 includes a pivot pin 660, and a clamping lever 655 rotatably attached to the pivot pin 660 so as to enable rotation of the clamping lever 655 about the pivot pin 660. In some cases, a housing 665 is also provided. In embodiments of this nature, the pivot pin 660 extends through the housing 665. The adjusting mechanism 650 can also include a plate 670 having threading 675 on an interior surface thereof that faces inwardly toward the pivot pin 660, as well as a nut 680 attached to the pivot pin 660.

In some embodiments, a ladder tripod system 700 is provided that includes a ladder 20 and a tripod assembly 10. The ladder 20 comprises a first stile 22, a second stile 24, and a plurality of rungs 25 extending between the first stile 22 and the second stile 24. In some cases, the ladder 20 is a telescoping ladder. Non-limiting examples of ladders 20 that can be used with the tripod assembly 10 and ladder tripod system 700 of the present disclosure are disclosed in U.S. Pat. Nos. 8,387,753; 8,225,906; U.S. Patent Application Publication No. 2019/0136623; U.S. Patent Application Publication No. 2019/0093428; and U.S. Patent Application Publication No. 2019/0055783, each of which is incorporated by reference herein in its entirety.

The first 22 and second 24 stiles each have a plurality of columns 21. In some embodiments, the columns 21 are formed of aluminum. However, skilled artisans appreciated that other materials are contemplated and are within the scope of the invention. Although the columns 21 are illustrated as having a circular cross-section (when viewed along a longitudinal axis of the columns 21), the columns 21 can alternatively have a rectangular cross-section such as those illustrated in U.S. Publication No. 2012/0267197 A1 assigned to the assignee of the instant application, the disclosure of which is hereby incorporated by reference in its entirety. Other cross-sections not specifically disclosed herein (e.g., square, oval or polygonal shapes) are also contemplated.

In some cases, each rung 25 comprises a generally planar first surface 27 and a generally planar second surface 29 opposite to the planar first surface 27. The first surface 27 of each rung 25 defines a planar standing surface. When the ladder 20 is extended for use and attached to the tripod assembly 10 (as described below), a user may step on the planar first surface 27. The planar first surface 27 of each rung 25 may have treads 36 defined therein to provide friction between the planar first surface 27 and the contact surface of a user (e.g., soles of the user's shoes).

Each rung 24 can be connected to a column 21 of the first stile 22 and a column 21 of the second stile 24. Each rung 25 can be connected to the columns 21 by a connector assembly 38. Each connector assembly 38 attached to columns 21 of the ladder 20 has a collar portion 39 for generally surrounding or contacting a column 21 of the ladder 20, and a rung portion integrally formed with the collar portion. The rung portion is held within (e.g., by friction fit) the hollow body of a rung 25. The rungs 25 can be substantially hollow so as to allow such a connector assembly 38 (described below) to fasten the rung 25 to a column 21 on each of the first stile 22 and the second stile 24. The rungs 25 can be extruded from aluminum, although other materials and means of manufacturing can also be used.

The ladder 20 can include a plurality of connector assemblies 38. The connector assemblies 38 of the ladder 10 can be substantially identical, although the connector assemblies of the first stile 22 are mirror images of connector assemblies of the second stile 24. The connector assemblies of the ladder 20 can have latch assemblies housed in the hollow portion of each rung 25 to unlock or selectively lock relative axial movement between adjacent columns 21. Such connector assemblies are described in U.S. Pat. Nos. 8,387,753 and 6,883,645, both assigned to the assignee of the instant application, the disclosure of each of which is hereby incorporated by reference in its entirety.

Each connector assembly 38 of the ladder 20 comprises a locking pin moveable between an extended position and a retracted position for extending into or retracting out of openings of adjacent columns 21 to selectively lock or release the columns 21 respectively. The ladder 20 includes a plurality of actuators (e.g., release buttons) that are manually actuatable and that permit collapsing the ladder 20 in a sequential manner. The sequence involves collapsing the columns 21 on a lower portion of the ladder prior to collapsing columns 21 immediately thereabove. The latch assembly can also have a release button that is manually actuatable to unlock the selectively locked relative axial movement between two adjacent columns 21 of the ladder 20. In some cases, an actuator may be provided on every connector assembly 38 of the ladder 20.

The present disclosure also includes a method of stabilizing a ladder 20 on the tripod assembly 10. The method comprises the step of extending the ladder 20 to a desired height. In certain embodiments, the ladder 20 can be extended by grasping a rung 25 so as to telescopically extend each column 21 of the ladder 20 relative to an adjacent column 21 of the ladder 20 (for instance, all columns 21 except the bottom-most or the bottom-few columns 21). Once a column 21 of the first stile 22 and the second stile 24 are each extended relative to adjacent columns 21 of the first stile 22 and the second stile 24 respectively, the columns 21 can each be locked to restrict relative axial (telescopic sliding) movement with respect to adjacent columns 21.

The method also comprises the step of extending the tripod assembly 10 to a desired height. This step involves telescopically extending each column 200 of the tripod assembly 10 relative to an adjacent column 200 of the tripod assembly 10 (the fully extended position is shown in FIG. 1). It should be noted that both the tripod assembly 10 and the ladder 20 should be extended from (i.e., starting at) the bottom so as to avoid automatic collapse of their respective columns 200, 21.

The method further comprises the step of connecting the tripod assembly 10 to the ladder 20. This step involves securing the bracket member 500 to an upper rung 25 of the ladder 20 by rotating the at least one knob 530 into the first position 535. This step also involves securing the bracket assembly 335 to a lower rung 25 of the ladder (i.e., a rung located below, such as immediately below, the upper rung to which the bracket member 500 is secured). The connecting rod 320 can be pivotally adjusted and slidably moved along the uppermost column 212 (such that the first locking pin 300 extends into a selectable hole 215) in order to create a certain distance and angle between the ladder 20 and the tripod assembly 10. The positioning of the connecting rod 320 relative to the uppermost column 212 of the tripod assembly 10 will depend on which particular rungs 25 the tripod assembly 10 is secured to.

After use, the tripod assembly 10 and the ladder 20 can be disconnected from each other. Thereafter, both the ladder 20 and the tripod assembly 10 can be collapsed, and transported and/or stored as desired.

Although the present embodiments has been described in considerable detail with reference to certain disclosed embodiments, the disclosed embodiments are presented for purposes of illustration and not limitation and other embodiments are possible. One skilled in the art will appreciate that various changes, adaptations, and modifications may be made without departing from the spirit of the invention.

What is claimed is:

1. A tripod assembly comprising:
    a plurality of legs;
    a central support member, each of the legs being pivotably coupled to the central support member;
    a central post, the central support member surrounding the central post;
    a plurality of columns disposed in a nested arrangement for relative axial movement in a telescopic fashion along a longitudinal axis of the plurality of columns between a fully-extended position and a collapsed position, wherein each column has a hollow body such that when the columns are collapsed from the fully-extended position, each column substantially nests within another one of the columns, the plurality of columns being received within the central post when the plurality of columns is in the collapsed position;
    a connecting rod having a first end and a second end, the first end being coupled to at least one of the columns;
    a bracket assembly coupled to the second end of the connecting rod, the bracket assembly being configured to receive a selectable rung of a ladder therein;
    a bracket member coupled to an uppermost one of the columns, the bracket member including a channel configured to receive a second selectable rung of the ladder therein, wherein the bracket member is pivotably coupled to the uppermost column, the bracket member comprising a lower wall and two side walls extending upwardly from the lower wall, wherein the channel is formed by a top surface of the lower wall and interior surfaces of the two side walls; and
    at least one knob rotatably coupled to a top edge of one of the side walls of the bracket member, wherein the at least one knob is rotatable between a first position and a second position, wherein a portion of the at least one knob extends above the channel when the at least one knob is in the first position such that the at least one knob is configured to abut the selectable rung of the ladder so as to secure the second selectable rung within the channel when the at least one knob is in the first position
    wherein the two side walls of the bracket member comprise a first side wall and a second side wall, the at least one knob being coupled to the second side wall, the bracket member being pivotable at a pivot point located nearer to the first side wall than to the second side wall.

2. The tripod assembly of claim 1, wherein the first end of the connecting rod is pivotably coupled to one of the columns.

3. The tripod assembly of claim 1, wherein no portion of the at least one knob extends above the channel when the at least one knob is in the second position.

4. The tripod assembly of claim 1, further comprising a central base member and a plurality of stabilizing arms, the central post coupled to and extending upwardly from the central base member, each of the stabilizing arms having a first end attached to a respective one of the legs and a second end attached to the central base member, each stabilizing arm being pivotable with respect to both the central base member and the respective leg.

5. The tripod assembly of claim 1, further comprising a lock, the lock being configured to limit movement of the legs relative to the central support member.

6. The tripod assembly of claim 1, wherein the central support member has an opening extending therethrough, the central post extending through the opening, the central support member being slidable along a length of the central post so as to selectively adjust an angle of the legs with respect to the central support member.

7. The tripod assembly of claim 1, wherein the bracket assembly comprises a plurality of portions, one portion of the bracket assembly being slidable relative to another portion of the bracket assembly.

8. The tripod assembly of claim 1, wherein the bracket assembly is pivotably coupled to the second end of the connecting rod.

9. The tripod assembly of claim 1, further comprising:
    a plurality of holes formed in the uppermost ones of the columns;
    a fastening assembly comprising a collar and a latch assembly, the collar generally surrounding the uppermost one of the columns and being slidable along a length of the uppermost one of the columns, the latch assembly having a first locking pin movable between a first position and a second position, the first locking pin being extendable into a selectable one of the holes to selectively lock the fastening assembly to the uppermost one of the columns so as to restrict slidable movement of the fastening assembly relative to the uppermost one of the columns.

10. The tripod assembly of claim 1, further comprising an adjusting mechanism coupled to the uppermost one of the columns and the bracket member, the adjusting mechanism enabling pivotable movement of the bracket member relative to the uppermost one of the columns.

11. The tripod assembly of claim 10, wherein the adjusting mechanism includes a clamping lever configured to be selectively clamped so as to restrict rotation of the clamping lever, thereby restricting pivotable movement of the bracket member relative to the uppermost one of the columns.

12. The tripod assembly of claim 1, further comprising a plurality of connector assemblies, each connector assembly comprising a collar portion and an extension portion, the collar portion generally surrounding a corresponding column and being in contact with the perimeter surface of the column.

13. The tripod assembly of claim 12, wherein each connector assembly comprises a latch assembly having a locking pin, each locking pin being moveable between an extended position and a retracted position, wherein when each locking pin is in the extended position, the locking pin extends into an aperture defined on the associated connector assembly and into openings of adjacent columns to selectively lock the columns so as to prevent relative axial movement between the adjacent columns, wherein when each locking pin is in the retracted position, the locking pin retracts out of the openings of the adjacent columns to release the adjacent columns so as to permit relative axial movement between the adjacent column.

14. A ladder tripod system comprising:
    a ladder comprising:
        a first stile;
        a second stile; and a plurality of rungs extending between the first stile and the second stile; and a tripod assembly comprising:
a plurality of legs;
a central support member, each of the legs being pivotably coupled to the central support member;
a central post, the central support member surrounding the central post;
a plurality of columns disposed in a nested arrangement for relative axial movement in a telescopic fashion along an axis of the plurality of columns between a fully-extended position and a collapsed position, wherein each column has a hollow body such that when the columns are collapsed from the fully-extended position, each column substantially nests within another one of the columns, the plurality of columns being received within the central post when the plurality of columns are in the collapsed position;
a connecting rod having a first end and a second end, the first end being coupled to one of the columns;
a bracket assembly coupled to the second end of the connecting rod, the bracket assembly being configured to receive a selectable one of the rungs therein;
a bracket member pivotally coupled to an uppermost one of the columns, the bracket member including a channel configured to receive a second selectable rung of the ladder therein, the bracket member comprising a lower wall and two side walls extending upwardly from the lower wall, wherein the channel is formed by a top surface of the lower wall and interior surfaces of the two side walls; and
at least one knob rotatably coupled to a top edge of one of the side walls of the bracket member, wherein the at least one knob is rotatable to position at least a portion of the at least one knob to extend above the channel such that the at least one knob is configured to abut the selectable rung of the ladder so as to secure the second selectable rung within the channel,
wherein the two side walls of the bracket member comprise a first side wall and a second side wall, the at least one knob being coupled to the second side wall, the bracket member being pivotable at a pivot point located nearer to the first side wall than to the second side wall.

15. The ladder tripod system of claim 14, wherein the second selectable rung configured to be received in the channel of the bracket member is located above the rung configured to be received in the bracket assembly.

16. The ladder tripod system of claim 14, wherein the ladder is a telescoping ladder.

* * * * *